(12) United States Patent
Fujita et al.

(10) Patent No.: US 7,836,333 B2
(45) Date of Patent: Nov. 16, 2010

(54) REDUNDANT CONFIGURATION METHOD OF A STORAGE SYSTEM MAINTENANCE/MANAGEMENT APPARATUS

(75) Inventors: Takahiro Fujita, Kawasaki (JP);
Hirokazu Ikeda, Kawasaki (JP);
Nobuyuki Osaki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 387 days.

(21) Appl. No.: 12/007,334

(22) Filed: Jan. 9, 2008

(65) Prior Publication Data

US 2008/0244580 A1 Oct. 2, 2008

(30) Foreign Application Priority Data

Mar. 29, 2007 (JP) ............................. 2007-087911

(51) Int. Cl.
*G06F 11/00* (2006.01)
(52) U.S. Cl. .......................................... 714/5; 714/13
(58) Field of Classification Search .................. 714/5, 714/11, 13
See application file for complete search history.

(56) References Cited

U.S. PATENT DOCUMENTS

| | | | | | |
|---|---|---|---|---|---|
| 5,621,884 | A | * | 4/1997 | Beshears et al. | 714/10 |
| 5,790,775 | A | * | 8/1998 | Marks et al. | 714/9 |
| 5,996,086 | A | * | 11/1999 | Delaney et al. | 714/4 |
| 6,460,144 | B1 | * | 10/2002 | Ashcroft et al. | 714/4 |
| 6,578,158 | B1 | * | 6/2003 | Deitz et al. | 714/11 |
| 6,625,753 | B1 | * | 9/2003 | Skogman et al. | 714/13 |
| 7,003,688 | B1 | | 2/2006 | Pittelkow et al. | |
| 7,032,130 | B2 | * | 4/2006 | Yamamoto et al. | 714/13 |

FOREIGN PATENT DOCUMENTS

| | | |
|---|---|---|
| EP | 1134658 A2 | 9/2001 |
| JP | 2003-115896 | 10/2001 |
| WO | WO02065249 A2 | 8/2002 |

OTHER PUBLICATIONS

O.G. Loques, Ph.D. et al, Flexible fault tolerance for distributed computer systems, IEE Proceedings, vol. 133, Pt. E, No. 6, Nov. 1986, pp. 319-332, XP009132238.
European Patent Office, Extended European Search Report (ESSR) for EP Patent Application No. 08 250 108.1, Apr. 27, 2010, Munich, Germany.

* cited by examiner

*Primary Examiner*—Marc Duncan
(74) *Attorney, Agent, or Firm*—Volpe and Koenig, P.C.

(57) ABSTRACT

Provided is a method of managing a computer system including a plurality of storage systems and a plurality of management appliances for managing the plurality of storage systems. A first management appliance and a second management appliance hold an identifier of a first storage system and management data obtained from the first storage system. The method includes the steps of: selecting a third management appliance from the plurality of management appliances when a failure occurs in the first management appliance; transmitting the identifier held in the second management appliance from the second management appliance to the selected third management appliance; and holding the identifier transmitted from the second management appliance in the selected third management appliance. Thus, it is possible to prevent, after failing-over due to an abnormality of a maintenance/management appliance, a single point of failure from occurring to reduce reliability of the maintenance/management appliance.

19 Claims, 17 Drawing Sheets

REDUNDANT RECONFIGURATION CALCULATION TABLE

| SVP ID | Addr2 | NUMBER OF ACTIVE SVP'S | NUMBER OF DKC'S | INSTALLATION FLOOR NUMBER |
|---|---|---|---|---|
| SVPB | AddrSB2 | 1 | 1 | 4 |
| SVPC | AddrSC2 | 2 | 2 | 4 |
| SVPD | AddrSD2 | 1 | 2 | 3 |

*FIG. 10*

MANAGEMENT DKC TABLE

| DKC ID | DKC Addr |
|---|---|
| NO ENTRY | |

2100d, 2101d, 2102d

STAND-BY SVP TABLE

| STAND-BY SVP ID | SVP Addr2 | MONITOR |
|---|---|---|
| NO ENTRY | | |

2200d, 2201d, 2202d, 2203d

REDUNDANT CONFIGURATION ACTIVE SVP TABLE

| ACTIVE SVP ID | SVP Addr1 | SVP Addr2 | MONITOR | NUMBER OF DKC'S |
|---|---|---|---|---|
| SVP2 | AddrS21 | AddrS22 | Y | 1 |
| SVPA | AddrS11 | AddrSA2 | Y | 1 |

2300d, 2301d, 2302d, 2303d, 2304d, 2305d

ACTIVE SVP-DKC MANAGEMENT TABLE

| ACTIVE SVP ID | DKC ID | DKC Addr |
|---|---|---|
| SVP2 | DKC2 | AddrD2 |
| SVPA | DKC1 | AddrD1 |

2400d, 2401d, 2402d, 2403d

SVP STATUS TABLE

| SVP ID | SVP Addr1 | SVP Addr2 | STATUS | RECONFIGURATION PERMISSION/INHIBITION | INSTALLATION FLOOR NUMBER |
|---|---|---|---|---|---|
| SVPB | AddrSB1 | AddrSB2 | STAND-BY | PERMITTED | 4 |

REDUNDANT CONFIGURATION METHOD OF A STORAGE SYSTEM MAINTENANCE/MANAGEMENT APPARATUS

CLAIM OF PRIORITY

The present application claims priority from Japanese application JP2007-87911 filed on Mar. 29, 2007, the content of which is hereby incorporated by reference into this application.

BACKGROUND

A technology disclosed in this specification relates to a redundant configuration method of a storage system maintenance/management apparatus.

There has been a gain in popularity of a computer system which interconnects a plurality of computers and a plurality of storage systems through a communication line (i.e., storage area network (SAN)) to enable sharing of the highly reliable and functional storage system by the plurality of computers. Enlargement and greater complexity of the computer system has increased importance of maintenance/management work. In the SAN, the storage system is shared by the plurality of computers. Thus, maintenance/management of the storage system is one of the most important tasks in the maintenance/management work of the computer system.

For example, a technology for improving reliability of maintenance/management of the storage system is disclosed in JP 3771162. According to this technology, a maintenance management processing unit disposed in a device to be maintained/managed is multiplexed. When a failure occurs in one of the maintenance management processing units, the other maintenance management processing units can be used. Hence, reliability of maintenance and management is improved (refer to FIG. 1 of JP 3771162).

SUMMARY

The enlargement and a greater data amount of the computer system have been accompanied by an increase in the number of storage systems in the computer system. As a result, when the maintenance/management apparatus is made redundant to improve reliability of maintenance/management of the storage system, many maintenance/management apparatuses exist in the computer system.

When the maintenance/management apparatus is made redundant, when a failure occurs in a primary maintenance/management apparatus, continued use of a maintenance/management function is enabled by being failed over to a secondary maintenance/management apparatus. However, after the failover to the secondary maintenance/management apparatus, even if the secondary maintenance/management apparatus exists in the computer system, the failover-target maintenance/management apparatus is not made redundant. In other words, the failover-target secondary maintenance/management appliance becomes a single point of failure (SPOF), which reduces reliability of the maintenance/management function is reduced.

According to a representative invention disclosed in this application, there is provided a method of controlling a computer system having a plurality of storage systems and a plurality of management apparatuses for managing the plurality of storage systems, each of the storage systems including a storage device for storing data and a controller for controlling storage of data in the storage device, each of the management apparatuses including a first interface for receiving data obtained from the storage system, a processor coupled to the first interface, and a memory coupled to the processor, the first interface being coupled to a first network for interconnecting the plurality of management apparatuses to communicate with one another, the plurality of management apparatuses including a first management apparatus, a second management apparatus, and a third management apparatus, the storage systems including a first storage system, the first management apparatus and the second management apparatus holding an identifier of the first storage system and management data obtained from the first storage system, the method comprising the steps of: selecting the third management apparatus from the plurality of management apparatuses when a failure occurs in the first management apparatus; transmitting the identifier of the first storage system held in the second management apparatus from the second management apparatus to the selected third management apparatus; and holding the identifier of the first storage system transmitted from the second management apparatus in the selected third management apparatus.

According to an embodiment of this invention, by reconfiguring a redundant configuration after the main maintenance/management apparatus in which a failure has occurred is failed over to the sub-maintenance/management apparatus, the maintenance/management apparatus is prevented from becoming a single point of failure (SPOF). Thus, it is possible to improve reliability of the maintenance/management function.

Even when a failure occurs in the sub-maintenance/management appliance, by reconfiguring the redundant configuration, it is possible to prevent the main maintenance/management appliance from becoming a single point of failure (SPOF).

BRIEF DESCRIPTION OF THE DRAWINGS

FIG. 10 is an explanatory diagram of the redundant reconfiguration calculation table according to the embodiment of this invention.

FIG. 11 is an explanatory diagram of a table held by the SVP which is a stand-by SVP after the redundant configuration is reconfigured according to the embodiment of this invention.

DETAILED DESCRIPTION OF THE PREFERRED EMBODIMENTS

Figure 1:
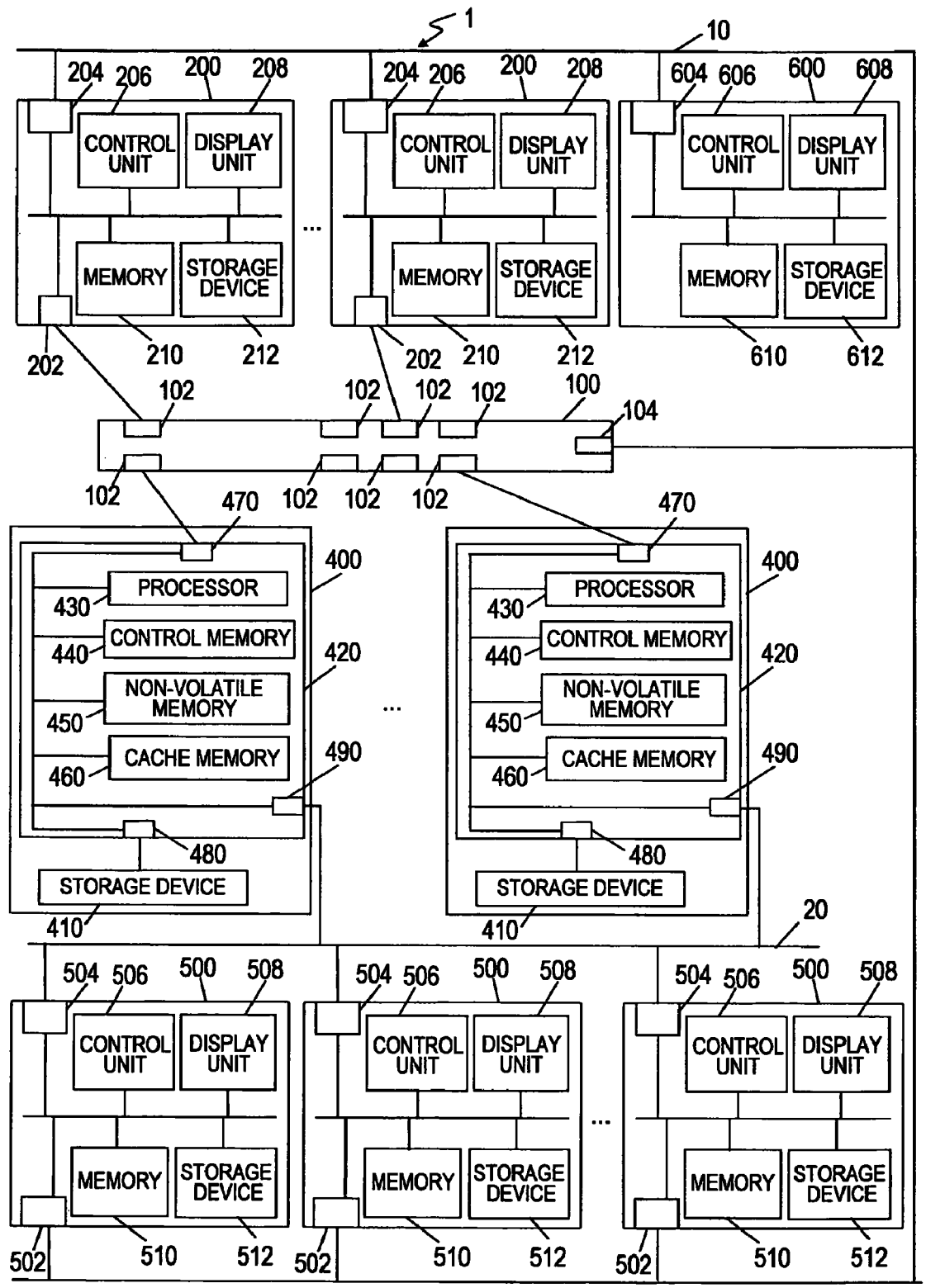
FIG. 1 is a block diagram showing a configuration of a computer system 1 according to an embodiment of this invention.

Referring to the drawings, the preferred embodiments of this invention will be described below.

<Overall Diagram>

FIG. 1 is a block diagram showing a configuration of a computer system 1 according to an embodiment of this invention.

The computer system 1 includes a plurality of computers 200, a management computer 600, a fibre channel switch 100, a plurality of storage systems 400, and a plurality of service processors (SVP) 500.

The computer 200 and the storage system 400 are interconnected via the fibre channel switch 100.

The storage system 400 and the SVP 500 are interconnected via a network 20.

The computer 200, the management computer 600, the fibre channel switch 100, and the SVP 500 are interconnected via a network 10.

<Fibre Channel Switch 100>

The fibre channel switch 100 includes a plurality of interfaces 102 and one or more interfaces 104. Each interface 102 is connected to the computer 200 or the storage system 400. The interface 104 is connected to the network 10.

<Computer 200>

The computer 200 includes a control unit 206, a memory 210, a storage device 212, a display unit 208, and interfaces 202 and 204. The interface 202 is connected to the fibre channel switch 100. The interface 204 is connected to the network 10.

For example, the storage device 212 may store an application program (not shown). The application program is read in the memory 210 to be executed by the control unit 206 when necessary. The control unit 206 that executes the application program can write or read data in or from the storage system 400 as the need arises. A data writing or reading request is transmitted from the interface 202 through the fibre channel switch 100 to the storage system 400.

<Management Computer 600>

The management computer 600 includes a control unit 606, a memory 610, a storage device 612, a display unit 608, and an interface 604. The interface 604 is connected to the network 10.

FIG. 1 shows only one management computer 600. However, the computer system 1 may include a plurality of management computers 600 connected to the network 10.

The management computer 600 can communicate with the SVP 500 via the network 10. As described below, the SVP 500 obtains information for managing the storage system 400 (such as performance information of the storage system 400) from the storage system 400. The management computer 600 can obtain such information from one or more SVP's 500 via the network 10. Accordingly, it is possible to manage pieces of information obtained from the plurality of storage systems 400 in a unified manner.

Alternatively, the management computer 600 can receive various notifications from the SVP 500. In this case, the management computer 600 can announce reception of a notification to an administrator or a user of the computer system 1 by displaying it in the display unit 608.

The management computer 600 can transmit various instructions or information to the SVP 500. The administrator or the user of the computer system 1 can control the SVP 500 by operating the management computer 600.

<Storage System 400>

The storage system 400 includes a storage controller 420 and a storage device 410.

The storage controller 420 includes a processor 430, a control memory 440, a non-volatile memory 450, a cache memory 460, and fibre channel interfaces 470, 480 and 490, which are interconnected.

The storage device 410 includes a recording medium, and reads or writes data in the recording medium according to a request from the storage controller 420.

The fibre channel interface 480 is connected to the storage device 410.

The storage controller 420 inputs/outputs data from/to the storage device 410 via the fibre channel interface 480.

The fibre channel interface 480 may be replaced by an interface such as ATA, serial ATA, parallel SCSI, or serial SCSI interface.

The storage controller 420 can improve reliability and performance of the storage system 400 by controlling the storage device 410 as redundant arrays of inexpensive disks (RAID).

The storage system 400 can include one or more storage devices 410. The storage device 410 may be a magnetic storage device such as a hard disk drive (HDD) or a storage device of another type (such as an optical storage device or a semiconductor memory device).

A physical or logical storage area (e.g., volume such as a physical volume or a logical volume, the storage area will be referred as a volume hereinafter) is set in the storage device 410. Each volume is uniquely identified by a volume identifier in the storage system 400.

The fibre channel interface 470 is connected to the fibre channel switch 100. The storage controller 420 receives, via the fibre channel interface 470, a data I/O request from the host computer 200 connected to the fibre channel switch 100. This data I/O request is made for the volume.

The network interface 490 is connected to the network 20.

Data transfer between the storage device 410 and the storage controller 420 is slower than data transfer in the storage controller 420. Accordingly, the storage controller 420 can improve data transfer performance by storing frequently accessed data in the cache memory 460. The cache memory 460 may be a semiconductor memory such as a DRAM.

The operation is realized by reading a program stored in the non-volatile memory 450 in the control memory 440 and executing the program by the processor 430. For example, the non-volatile memory 450 may be a HDD or a non-volatile semiconductor memory such as a flash memory. The control memory 440 may be a semiconductor memory such as a DRAM.

The storage controller 420 is a single processor. However, the storage controller 420 may be configured as a multiprocessor. In other words, the storage controller 420 may include one or more processors 430.

<SVP 500>

The SVP 500 is connected to the storage system 400 via the network 20 to maintain and manage the storage system 400. The SVP 500 includes a control unit 506, a display unit 508, a memory 510, a storage device 512, and first and second interfaces 502 and 504.

The first interface 502 is connected to the network 10. The management computer 600 and the SVP 500 communicate with each other via the first interface 502 and the network 10.

The second interface 504 is connected to the network 20. The storage system 400 and the SVP 500 communicate with each other via the second interface 504 and the network 20. The SVP's 500 communicate with each other via the second interface and the network 20.

Next, referring to FIG. 2, the SVP 500 will be described in detail.

Figure 2:
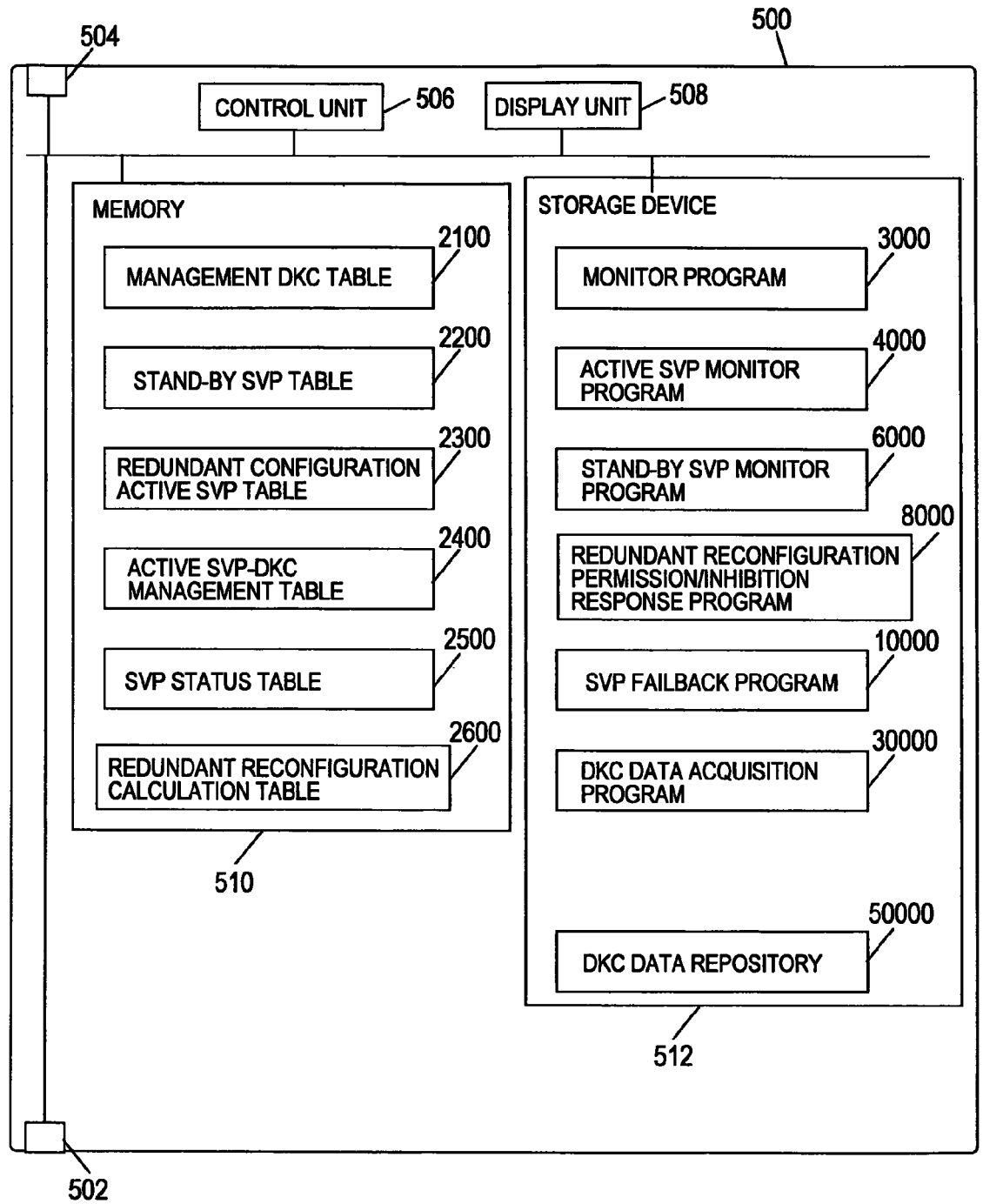
FIG. 2 is a block diagram showing a configuration of the SVP according to the embodiment of this invention.

FIG. 2 is a block diagram showing a configuration of the SVP 500 according to the embodiment of this invention.

The memory 510 stores a management DKC table 2100, a stand-by SVP table 2200, a redundant configuration active SVP table 2300, an active SVP-DKC management table 2400, an SVP status table 2500, and a redundant reconfiguration calculation table 2600.

The storage device 512 stores a monitor program 3000, an active SVP monitor program 4000, a stand-by SVP monitor program 6000, a redundant reconfiguration permission/inhibition response program 8000, an SVP failback program 10000, and a DKC data acquisition program 30000. These programs are read from the storage device 512 into the memory 510 to be executed by the control unit 506.

<DKC Data Repository 50000>

The storage device 512 further stores a DKC data repository 50000. Data regarding the storage system 400 is stored in the DKC data repository 50000. Specifically, the SVP 500 obtains data (such as configuration data or performance data) used for managing the storage system 400 from the storage system 400.

The SVP 500 periodically obtains the data from the storage system 400 to store them in the DKC data repository 50000. The DKC data repository 50000 holds data obtained in the past of a certain period. Upon storage of data of a certain period or more, oldest data is deleted from the DKC data repository 50000, and latest data obtained from the storage system 400 is stored in the DKC data repository 50000.

For example, the data stored in the DKC data repository 50000 may include at least one of data indicating whether a failure has occurred in the processor 430, data indicating a use rate of the cache memory 460, data indicating the number of times of inputting/outputting data in the interface 470, and data indicating the number of times of inputting/outputting data in the storage device 410.

The SVP 500 not only obtains the data from the storage system 400 but also executes setting in the storage system 400 (such as start-up or shutdown of the storage system 400, or configuration changing).

A combination of the SVP 500 with the storage system 400 from which the SVP 500 obtains data is managed based on the management DKC table 2100. The management DKC table 2100 will be described below (refer to FIG. 4). The SVP 500 that periodically obtains data from the storage system 400 will be called an active SVP.

The computer system 1 of the embodiment includes a greater number of SVP's 500 than that of storage systems 400. Accordingly, there are SVP's 500 which do not obtain data from the storage system 400. Such an SVP 500 stands by (redundant) to take over an operation of the active SVP when a failure occurs in the active SVP. Such an SVP 500 will be called a stand-by SVP.

Whether the SVP 500 operates as an active SVP or a stand-by SVP is managed based on the SVP status table 2500. The SVP 500 can operate as an active SVP or a stand-by SVP. The SVP status table 2500 will be described below (refer to FIG. 4).

<Logical Drawing 1>

Figure 3A:
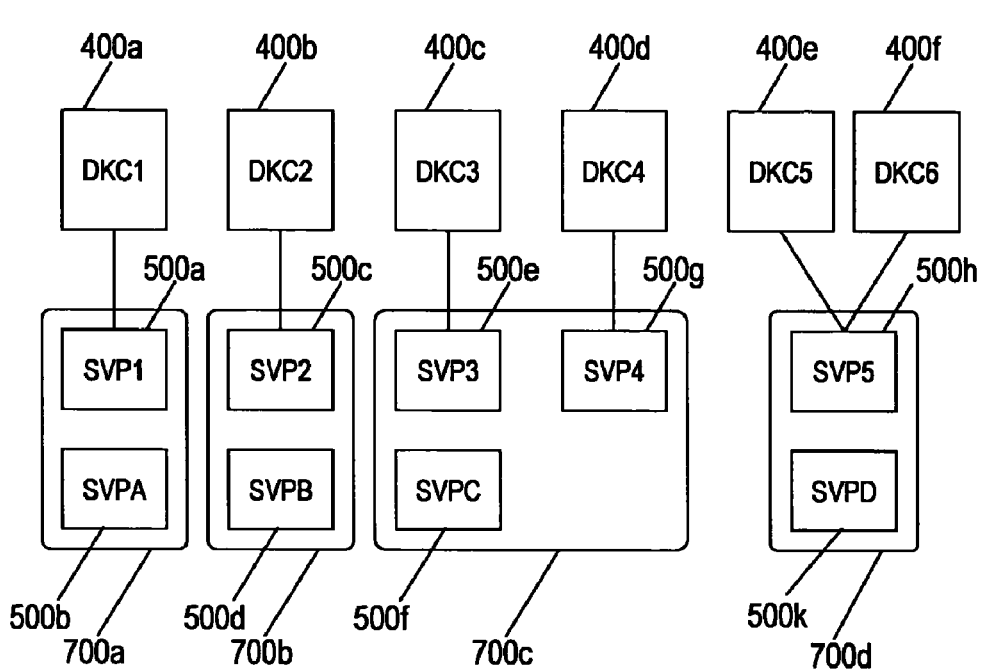
FIGS. 3A and 3B are explanatory diagrams logically showing a relation between the storage system and the SVP according to the embodiment of this invention.
Figure 3B:
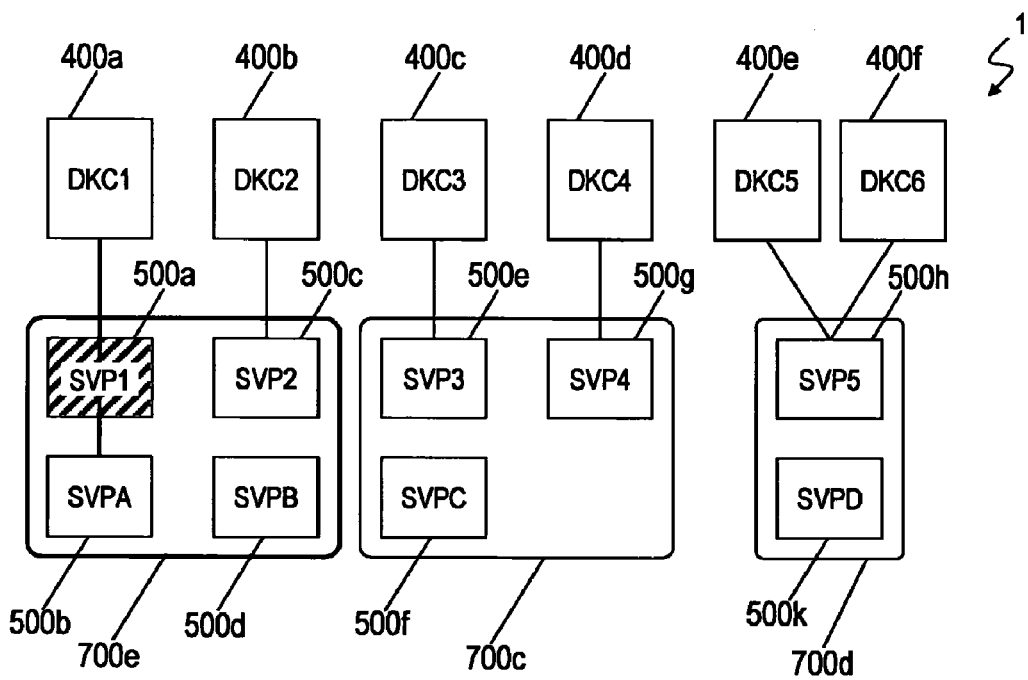

FIGS. 3A and 3B are explanatory diagrams logically showing a relation between the storage system 400 and the SVP 500 according to the embodiment of this invention.

FIG. 3A shows a status before a failure occurs. FIG. 3B shows a status after a failure occurs in an SVP1, the SVP1 fails over to an SVPA (in other words, the SVPA takes over the operation of the SVP1), and a redundant configuration 700 having an SVPB set as a stand-by SVP is reconfigured.

In FIGS. 3A and 3B, the storage system 400 and the SVP 500 (active SVP) which manages the storage system 400 are connected to each other by a line.

For example, the SVP 500a (SVP1) operates as an active SVP to manage a storage system 400a (DKC1). In the description below, "management" will be a term including a concept of "maintenance".

SVP1 to SVP5 and SVPA to SVPD of FIGS. 3A and 3B are identifiers of SVP's 500. SVP 500a to SVP 500k are each equivalent to any one of the plurality of SVP's 500 shown in FIG. 1. Similarly, DKC1 to DKC6 are identifiers of the storage systems 400. Storage systems 400a to 400f are each equivalent to any one of the plurality of storage systems 400 shown in FIG. 1.

A rounded-corner rectangle shown in each of FIGS. 3A and 3B indicates a redundant configuration 700. The redundant configuration 700 is a set of SVP's 500 which include one or more active SVP's and one or more stand-by SVP's for making the active SVP's redundant. To distinguish one redundant configuration 700 from another, an index such as "a" or "b" is used. For example, SVP 500a (SVP1) and SVP 500b (SVPA) constitute a redundant configuration 700a. The SVP 500b (SVPA) operates as a stand-by SVP of the SVP 500a (SVP1). In other words, as described below, when a failure occurs in the SVP 500a (SVP1), the SVP 500a (SVP1) fails over to the SVP 500b (SVPA), and then SVP 500b (SVPA) manages the storage system 400a (DKC1).

The SVP 500e (SVP3) is an active SVP for managing the storage system 400c (DKC3), and the SVP 500g (SVP4) is an active SVP for managing the storage system 400d (DKC4). The SVP 500f (SVPC) is a stand-by SVP for constituting the redundant configuration 700c with the SVP 500e (SVP3) and the SVP 500g (SVP4). In other words, when a failure occurs in one of the SVP 500e (SVP3) and the SVP 500g (SVP4), the failed SVP 500 fails over to the SVP 500f (SVPC), and then manages the storage system 400c (DKC3) or the storage system 400d (DKC4).

<Example of Table Held by SVP>

The management DKC table 2100, the stand-by SVP table 2200, the redundant configuration active SVP table 2300, the active SVP-DKC management table 2400, and the SVP status table 2500 stored in the memory 510 of the SVP 500 will be described.

Figure 4:
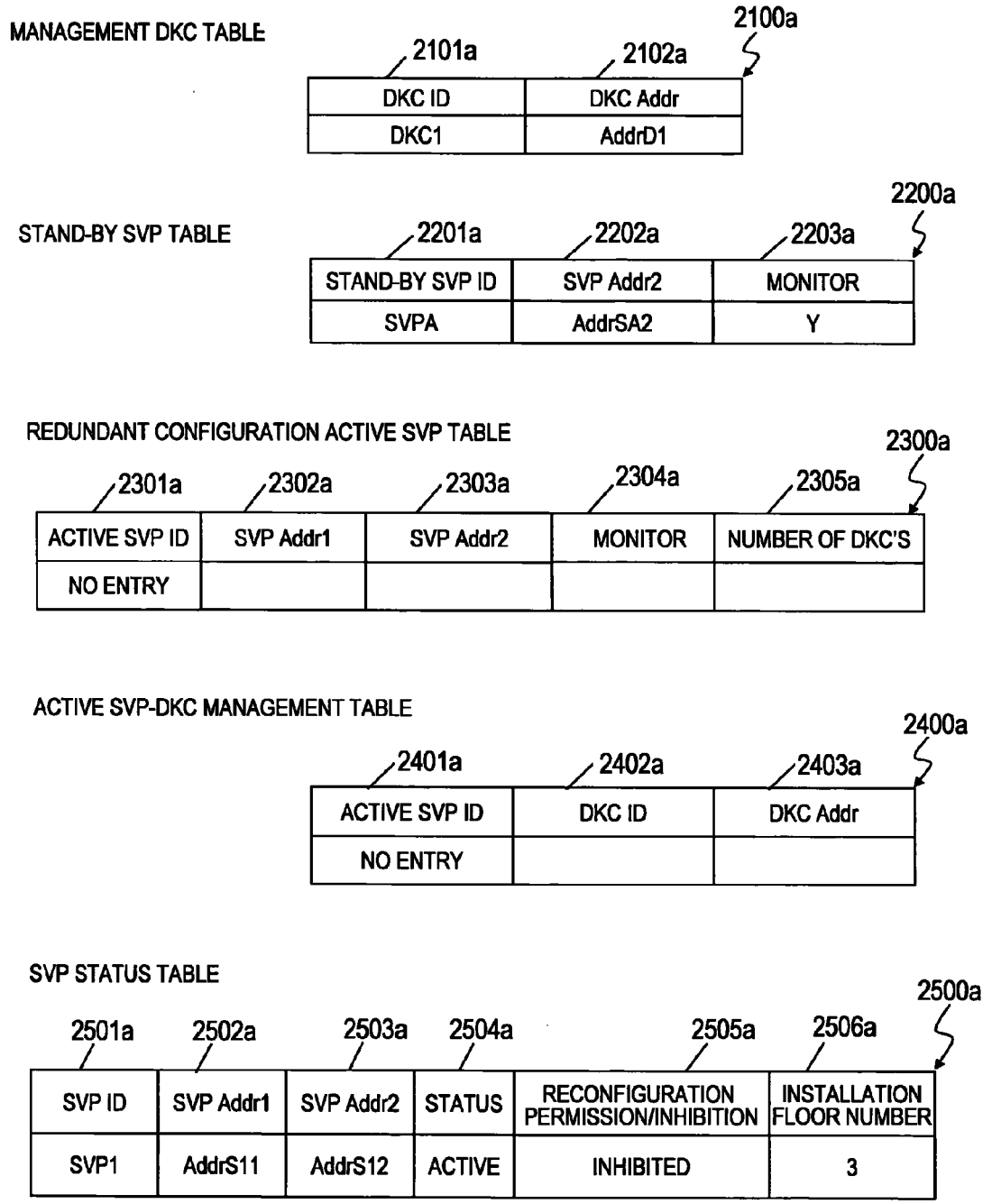
FIG. 4 is an explanatory diagram of a table held by the SVP which is an active SVP according to the embodiment of this invention.
Figure 5:
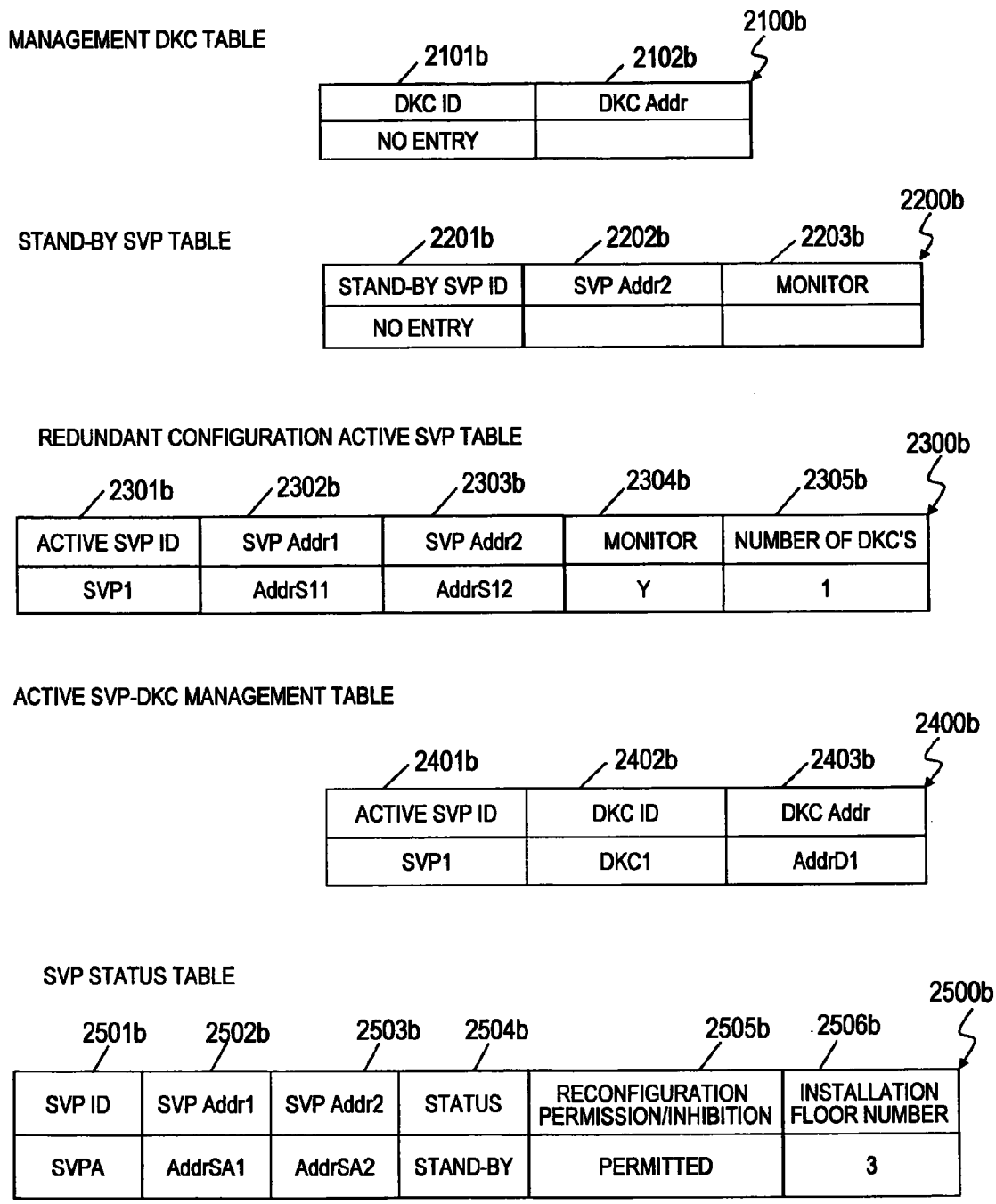
FIG. 5 is an explanatory diagram of a table held by the SVP which is a stand-by SVP according to the embodiment of this invention.

Referring to FIGS. 4 and 5, examples of the SVP 500a (SVP1) as an active SVP and the SVP 500b (SVPA) as a stand-by SVP in FIG. 3A will be described.

FIG. 4 is an explanatory diagram of a table held by the SVP 500a (SVP1) which is an active SVP according to the embodiment of this invention.

FIG. 5 is an explanatory diagram of a table held by the SVP 500b (SVPA) which is a stand-by SVP according to the embodiment of this invention.

The table held by the stand-by SVP has items similar to those of the table held by the active SVP.

<Management DKC Table 2100>

The management DKC table 2100 is used by the SVP 500 for managing the storage system 400. The SVP 500 obtains data from the storage system 400 set in the management DKC table 2100.

There are entries in the management DKC table 2100 while the SVP 500 operates as an active SVP. However, there are no entries in the management DKC table 2100 while the SVP 500 operates as a stand-by SVP. The management DKC table 2100 may include one or more entries while the SVP 500 operates as the active SVP. Entries of the table correspond to lines of each table shown in FIG. 4 or the like. When the management DKC table 2100 includes a plurality of entries, the SVP 500 manages a plurality of storage systems 400.

The management DKC table 2100 manages DKC_ID 2101 and DKC_Addr 2102. The DKC_ID 2101 is an identifier for uniquely identifying the storage system 400 for obtaining data in at least the computer system 1. The DKC_Addr 2102 is an address of an interface 490 of the storage system 400 identified by the DKC_ID 2101. The SVP 500 communicates with the storage system 400 by using this address to obtain data.

In FIG. 4 or the like, as in the case of DKC_ID 2101a, an alphabet index (such as "a" or "b") is added to a number for identifying each item. This index indicates a table of which SVP 500 each item belongs to. For example, the DKC_ID 2101a indicates DKC_ID 2101 of the management DKC table 2100 held by the SVP 500a (SVP1). The same holds true for other items.

The management DKC table 2100a shown in FIG. 4 is a management DKC table 2100 held by the SVP 500a (SVP1) which is an active SVP. In the DKC_ID 2101a and the DKC_Addr 2102a of the management DKC table 2100a, "DKC1" which is an identifier of the storage system 400a managed by the SVP 500a (SVP1) and an address "AddrD1" of the interface 490 of the storage system 400a are set, respectively.

The management DKC table 2100b shown in FIG. 5 is a management DKC table 2100 held by the SVP 500b (SVPA) which is a stand-by SVP. As the SVP 500b (SVPA) does not manage the storage system 400, there are no entries in the management DKC table 2100b.

<Stand-by SVP Table 2200>

The stand-by SVP table 2200 is used by the active SVP for managing the stand-by SVP which takes over the operation when a failure occurs in the active SVP.

There are normally entries in the stand-by SVP table 2200 of the active SVP. On the other hand, there are no entries in the stand-by SVP table 2200 of the stand-by SVP.

When there are no entries in the stand-by SVP table 2200 of the active SVP, there is no stand-by SVP which takes over the operation when a failure occurs in the active SVP. In other words, the active SVP is a single point of failure (SPOF).

The stand-by SVP table 2200 manages stand-by SVP_ID 2202, SVP_Addr2 2202, and monitor 2203.

The stand-by SVP_ID 2201 is an identifier for uniquely identifying the SVP 500 which operates as a stand-by SVP in at least the computer system 1. The SVP_Addr2 2202 is an address of the second interface 504 of the SVP 500 identified by the stand-by SVP_ID 2201. In the monitor 2203, a value indicating whether the active SVP monitors a normal operation of the stand-by SVP. When "Y" is set in the monitor 2203, the active SVP monitors a corresponding stand-by SVP. On the other hand, if "N" is set in the monitor 2203, the active SVP does not monitor the stand-by SVP. For example, the active SVP may monitor a stand-by SVP based on a heartbeat via the network 20.

The stand-by SVP table 2200a is a stand-by SVP table 2200 held by the SVP 500a (SVP1) which is the active SVP (FIG. 4). In standby SVP_ID 2201a and SVP Addr2 2202a of the stand-by SVP table 2200a, "SVPA" which is an identifier of the SVP 500b (SVPA) and an address "AddrSA2" of the second interface 504 of the SVP 500b (SVPA) are set, respectively. This indicates that the SVP 500a (SVP1) is made redundant by the SVP 500b (SVPA). In other words, the SVP 500a (SVP1) and the SVP 500b (SVPA) constitute a redundant configuration 700a. The SVP 500b (SVPA) is a stand-by SVP for making the SVP 500a (SVP1) redundant.

"Y" is set in the monitor 2203a of the stand-by SVP table 2200a. This indicates that the SVP 500a (SVP1) uses the stand-by SVP table 2200a to monitor a failure of the SVP 500b (SVPA).

As the stand-by SVP table 2200b is a stand-by SVP table 2200 held by the SVP 500b (SVPA) which is a stand-by SVP, no entry is included (FIG. 5).

<Redundant Configuration Active SVP Table 2300>

The redundant configuration active SVP table 2300 is used by the stand-by SVP for managing an active SVP whose operation is taken over by the stand-by SVP.

There are normally entries in the redundant configuration active SVP table 2300 of the stand-by SVP. On the other hand, there are no entries in the redundant configuration active SVP table 2300 of the active SVP.

The stand-by SVP monitors an active SVP set in the redundant configuration SVP table 2300. When a failure occurs in the active SVP, the stand-by SVP takes over the operation of the active SVP (in other words, the failed active SVP fails over to the stand-by SVP).

When the number of stand-by SVP's is greater than that of active SVP's, there may be a stand-by SVP which holds a redundant configuration active SVP table 2300 with no entries. This stand-by SVP that holds the redundant configuration active SVP table with no entries is a spare stand-by SVP.

The redundant configuration active SVP table 2300 manages active SVP ID 2301, SVP Addr 1 2302, SVP Addr 2 2303, monitor 2304, and the number of DKC's 2305.

The active SVP ID 2301 is an identifier for uniquely identifying the SVP 500 which operates as an active SVP in at least the computer system 1.

The SVP Addr 1 2302 and the SVP Addr 2 2303 are an address of the first interface 502 and an address of the second interface 504 of the SVP 500 identified by the active SVP ID 2301, respectively.

In the monitor 2304, a value indicating whether the stand-by SVP monitors a normal operation of the active SVP identified by the active SVP_ID 2301 is set. When "Y" is set in the monitor 2304, the stand-by SVP monitors a corresponding active SVP. On the other hand, if "N" is set in the monitor 2304, the stand-by SVP does not monitor the active SVP. For example, the stand-by SVP monitors the active SVP based on a heartbeat via the network 20.

In the number of DKC's 2305, the number of DKC's managed by the active SVP identified by the active SVP ID 2301 is set.

As the redundant configuration active SVP table 2300a is a redundant configuration operation table 2300 held by the SVP 500a (SVP1) which is an active SVP, no entries are included (FIG. 4).

The redundant configuration active SVP table 2300b is a redundant configuration active SVP table 2300 held by the SVP 500b (SVPA) which is a stand-by SVP (FIG. 5). In the active SVP ID 2301b, the SVP Addr 1 2302b, and the SVP Addr 2 2303b, "SVP1" which is an identifier of the SVP 500a (SVP1), an address "Addr S11" of the first interface 502 of the SVP 500a (SVP1), and an address "Addr S12" of the second interface 504 of the SVP 500a (SVP1) are set, respectively "Y" is set in the monitor 2304b. In the number of DKS's 2305b, "1" which is the number of storage system 400 managed by the SVP 500a (SVP1) is set. This indicates that the SVP 500b (SVPA) monitors the SVP 500a (SVP1) and the SVP 500a (SVP1) manages one storage system 400.

<Active SVP-DKC Management Table 2400>

The active SVP-DKC management table 2400 is used by the stand-by SVP for managing the active SVP which constitutes a redundant configuration 700 with the stand-by SVP and the storage system 400 managed by the active SVP.

There are no entries in the active SVP-DKC management table 2400 held by the active SVP. On the other hand, there are normally entries in the active SVP-DKC management table 2400 held by the stand-by SVP. However, no entry exists in the active SVP-DKC management table 2400 held by the spare stand-by SVP. There are no entries in the management DKC table 2100, the stand-by SVP table 2200, the redundant configuration active SVP table 2300, and the active SVP-DKC management table 2400 held by the spare standby SVP.

The active SVP-DKC management table 2400 is used by the stand-by SVP for reconfiguring the redundant configuration 700 after failover. In this case, the stand-by SVP reconfigures the redundant configuration 700 so that the stand-by SVP can fail over to another stand-by SVP. The reconfiguration of the redundant configuration 700 will be clarified in description of a processing flow of the monitor program 3000 (refer to FIGS. 6 to 9B).

The active SVP-DKC management table 2400 manages active SVP ID 2401, DKC D 2402, and DKC Addr 2403. The active SVP ID 2401 is an identifier for uniquely identifying the SVP 500 which operates as an active SVP in at least the computer system 1. The DKC ID 2402 is an identifier for uniquely identifying the storage system 400 managed by the active SVP to obtain data in at least the computer system. The DKC Addr 2403 is an address of the interface 490 of the storage system 400 identified by the DKC ID 2402.

As the active SVP-DKC management table 2400a is an active SVP-DKC management table 2400 held by the SVP 500 (SVP1) which is an active SVP, no entries are included shown in FIG. 4.

The active SVP-DKC management table 2400b is an active SVP-DKC management table 2400 held by the SVP 500b (SVPA) which is a stand-by SVP (FIG. 5).

In the active SVP ID 2401b, "SVP1" which is an identifier of the SVP 500a (SVP1) is set. This setting indicates that the SVP 500b (SVPA) monitors the SVP 500a (SVP1).

In the DKC ID 2402b and the DKC Addr 2403b, "DKC1" which is an identifier of the storage system 400a (DKC1) managed by the SVP 500a (SVP1) and an address "AddrD1" of the interface 490 of the storage system 400a (DKC1) are set, respectively. These settings indicate that the SVP 500a (SVP1) manages the storage system 400a (DKC1), and the address of the interface 490 of the storage system 400a (DKC1) is "AddrD1".

<SVP Status Table 2500>

The SVP status table 2500 is a table used by the SVP 500 for managing its own status. The SVP status table 2500 is also used by all the SVP's 500 of the active SVP, the stand-by SVP, and the spare stand-by SVP for managing their own statuses.

The SVP status table 2500 manages SVP ID 2501, SVP Addr1 2502, SVP Addr2 2503, a status 2504, a reconfiguration permission/inhibition 2505, and an installation floor number 2506.

The SVP ID 2501 is an identifier for uniquely identifying its own SVP 500 (SVP 500 holding the SVP status table 2500) in at least the computer system 1.

The SVP Addr1 2502 and the SVP Addr2 2503 are addresses of the first and second interfaces 502 and 504 of the SVP 500, respectively.

In the status 2504, a value indicating whether the own SVP 500 is an active SVP or a stand-by SVP is set. The SVP 500 operates as an active SVP when "active" is set in the status 2504, and as a stand-by SVP when "stand-by" is set.

In the reconfiguration permission/inhibition 2505, a value indicating whether to respond to a reconfiguration request of the redundant configuration 700 is set. When "permitted" is set in the reconfiguration permission/inhibition 2505, response is made to the reconfiguration request. When "inhibited" is set, no response is made to the reconfiguration request. For the SVP 500 where the redundant configuration 700 is not reconfigured, by setting "inhibited" in the reconfiguration permission/inhibition 2505, reconfiguration of the redundant configuration 700 can be prevented.

In the installation floor number 2506, the number of floors (of a building) where the SVP is installed is set by the administrator.

The SVP status table 2500a is an SVP status table 2500 held by the SVP 500a (SVP1) which is an active SVP. In the SVP ID 2501a, the SVP Addr1 2502a, and the SVP Addr2 2503a, "SVP1" which is the own identifier of the SVP 500a (SVP1), an address "AddrS11" of a first interface 502 of the SVP 500a (SVP1) itself, and an address "AddrS12" of the second interface 504 of the SVP 500a (SVP1) itself are set, respectively. By changing these addresses, the addresses of the first and second interfaces 502 and 504 are changed. In the status 2504a, "active" indicating that the SVP 500a (SVP1) operates as an active SVP is set. In the reconfiguration permission/inhibition 2505a, as the SVP 500a is not a stand-by SVP, "inhibited" indicating that no response is made to the reconfiguration request is set. In the installation floor number 2506a, "3" is set. This means that the SVP 500a (SVP1) is installed on the third floor.

The SVP status table 2500b is an SVP status table 2500 held by the SVP 500b (SVPA) which is a stand-by SVP. In the SVP ID 2501b, the SVP Addr1 2502b, and the SVP_Addr2_2503b, "SVPA" which is the own identifier of the SVP 500b (SVPA), an address "AddrSA1" of a first interface 502 of the SVP 500b (SVPA) itself, and an address "AddrSA2" of the second interface 504 of the SVP 500b (SVPA) itself are set, respectively. By changing these addresses, the addresses of the first and second interfaces 502 and 504 are changed. In the status 2504b, "stand-by" indicating that the SVP 500b (SVPA) operates as a stand-by SVP is set. In the reconfiguration permission/inhibition 2505b, "permitted" indicating that the SVP 500b (SVPA) responds to the reconfiguration request is set. In the installation floor number 2506b, "3" is set. This means that the SVP 500b (SVPA) is installed on the third floor.

According to this embodiment, the SVP status table 2500 manages the installation floor number 2506 as information indicating the installation position of the SVP 500. However, the installation floor number 2506 is only an example of information indicating the installation position of the SVP 500. Information indicating other positions may be managed. For example, the SVP status table 2500 may manage information indicating coordinates of the installation position of the SVP 500.

<Monitor Program 3000>

The monitor program 3000 is a program executed by the SVP 500 to monitor the other SVP's 500. The monitor program 3000 is read from the storage device 512 by the control unit 506 of the SVP 500 to be periodically executed.

When the SVP 500 is an active SVP, the SVP 500 obtains data from the storage system 400, and monitors the stand-by SVP. On the other hand, when the SVP 500 is a stand-by SVP, the SVP 500 monitors the active SVP.

Figure 6:
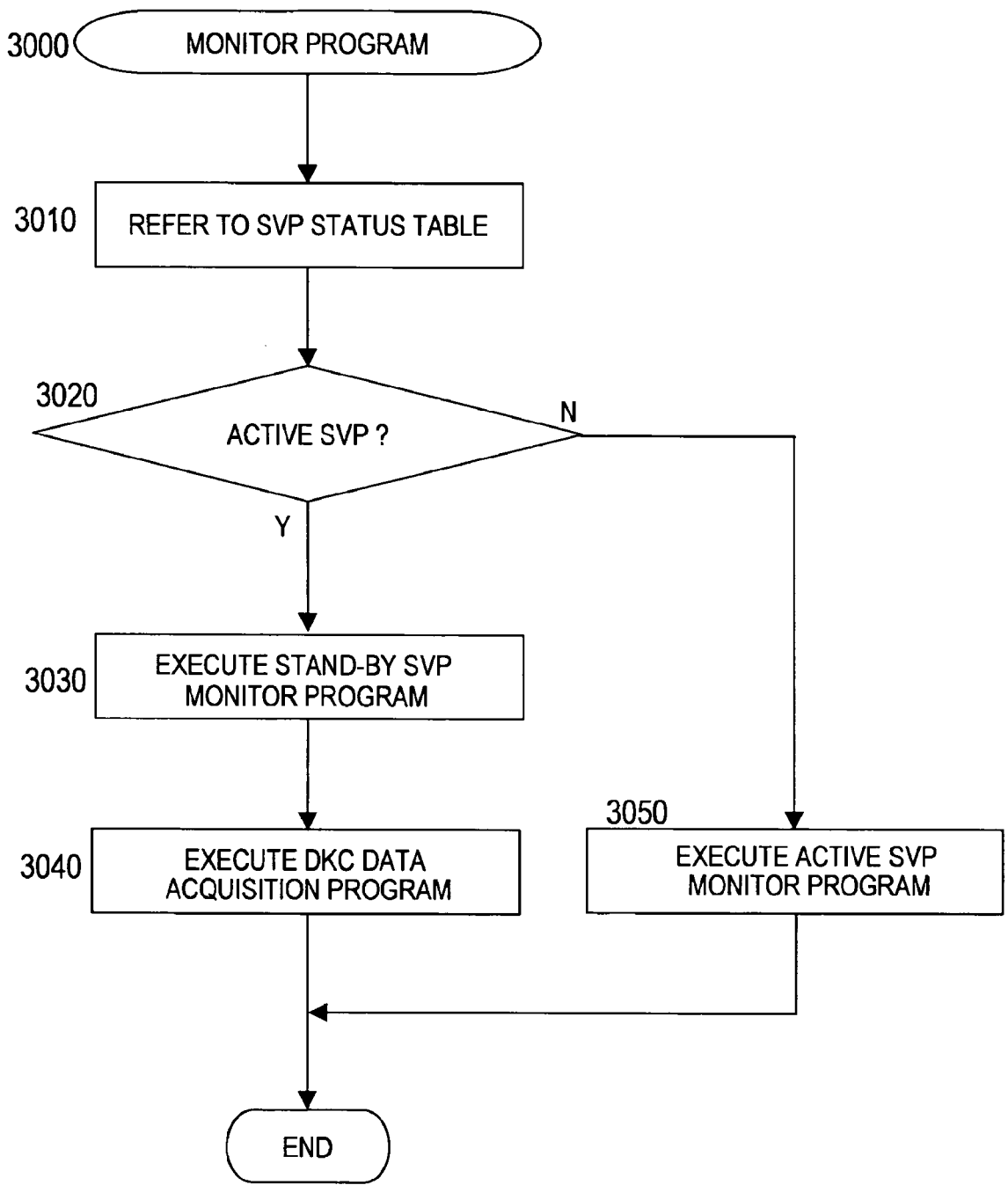
FIG. 6 is a flowchart showing a process of the monitor program executed according to the embodiment of this invention.

FIG. 6 is a flowchart showing a process of the monitor program 3000 executed according to the embodiment of this invention.

Steps shown in FIG. 6 are executed by the control unit 506 by executing the monitor program 3000.

The control unit 506 refers to the SVP status table 2500 in Step 3010.

In Step 3020, the control unit 506 judges whether the status 2504 of the SVP status table 2500 is "active". When the status 2504 is "active", the own SVP 500 is an active SVP. In this case, the control unit 506 executes a stand-by SVP monitor program 6000 (Step 3030), and then executes a DKC data acquisition program 30000 (Step 3040) to finish the process.

Figure 8:
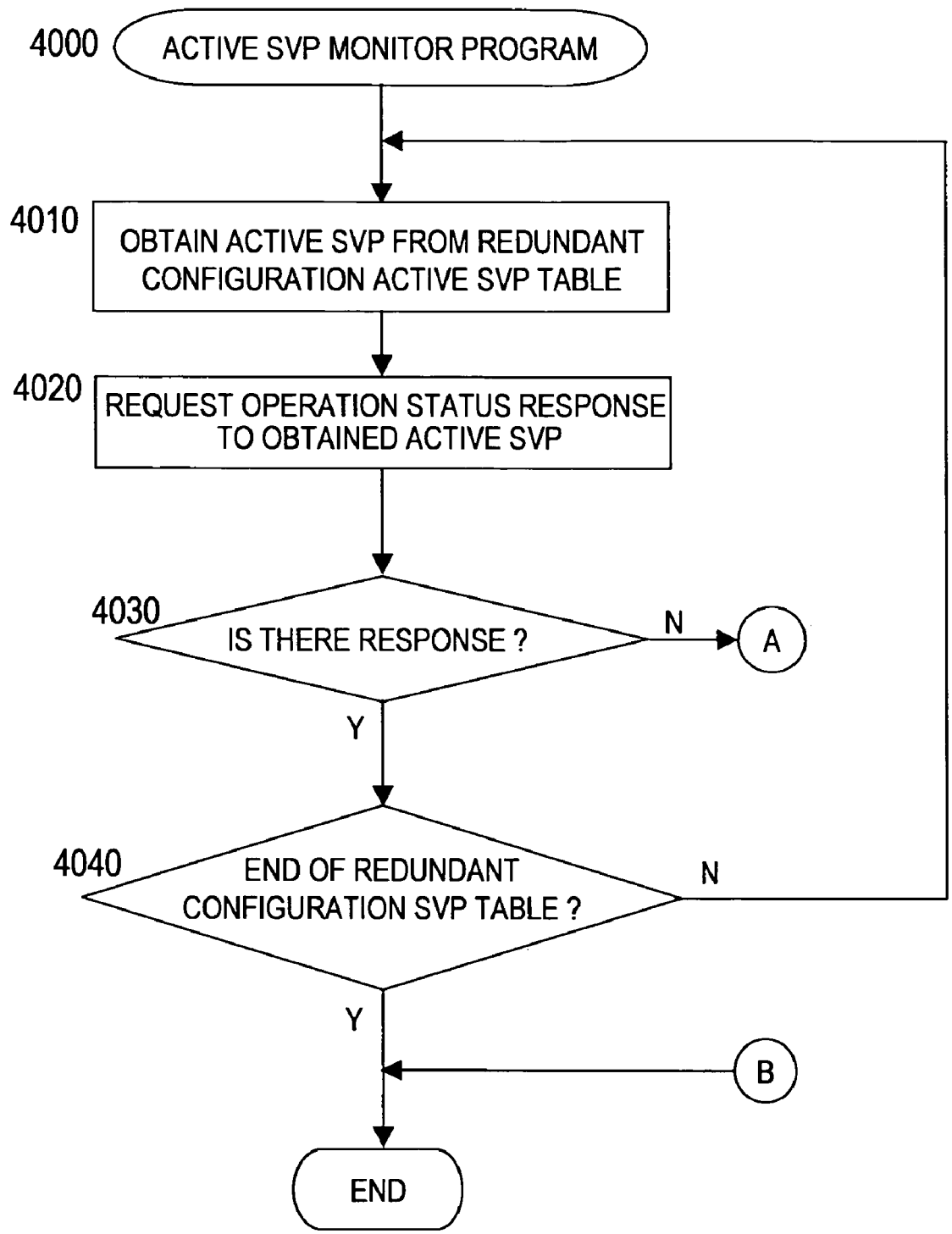
FIG. 8 is a flowchart showing a process of the active SVP monitor program executed according to the embodiment of this invention.

On the other hand, if it is judged in Step 3020 that the status 2504 of the SVP status table 2500 is not "active", the own SVP 500 is a stand-by SVP. In this case, the control unit 506 executes an active SVP monitor program 4000 (Step 3050) to finish the process. Referring to FIG. 8, the active SVP monitor program 4000 will be described below in detail.

For example, the control unit 506 of the SVP 500a refers to the status 2504a of the SVP status table 2500a. In this case, as "active" is set in the status 2504a, the control unit 506 of the SVP 500a judges that its own SVP is an active SVP.

On the other hand, the control unit 506 of the SVP 500b refers to the status 2500b of the SVP status table 2500b. In this case, as "stand-by" is set in the status 2504b, the control unit 506 of the SVP 500b judges that its own SVP is not an active SVP (i.e., its own SVP is a stand-by SVP).

The DKC data acquisition program 30000, the stand-by SVP monitor program 6000, and the active SVP monitor program 4000 will be described later with reference to FIGS. 7 to 9B, and 12.

<DKC Data Acquisition Program 30000>

The DKC data acquisition program 30000 is a program used by the active SVP for obtaining data of the storage system 400, storing the obtained data in its own DKC data repository 50000, and further storing the data in the DKC data repository 50000 of the stand-by SVP constituting the redundant configuration 700. The DKC data acquisition program 30000 is read from the storage device 512 by the control unit 506 of the SVP 500 to be executed. The DKC data acquisition program 30000 is executed by the control unit 506 of the active SVP in Step 3040 of the monitor program 3000. For example, the control unit 506 of the SVP 500a (SVP1) shown in FIG. 3A executes the DKC data acquisition program 30000.

Figure 7:
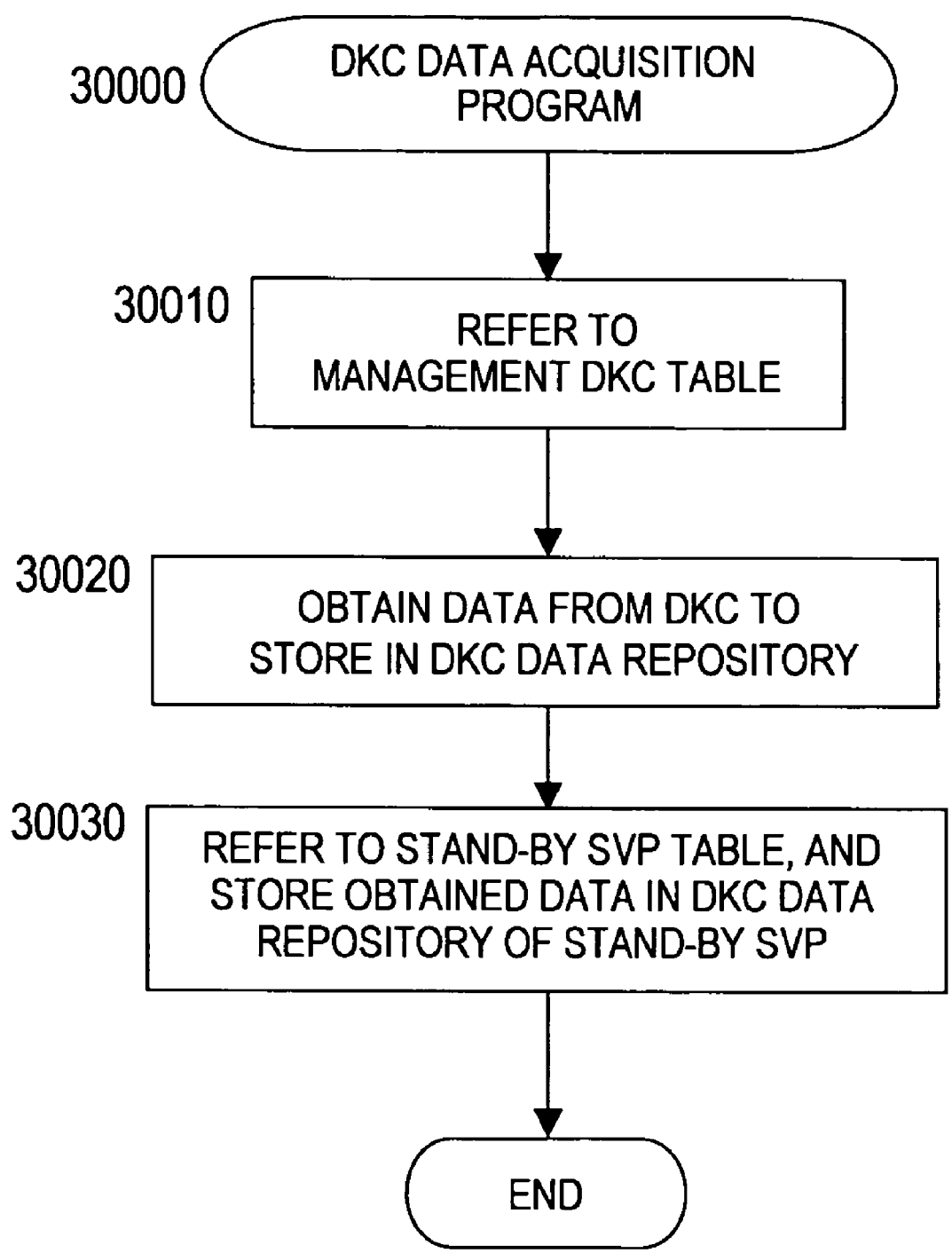
FIG. 7 is a flowchart showing a process of the DKC data acquisition program executed according to the embodiment of this invention.

FIG. 7 is a flowchart showing a process of the DKC data acquisition program 30000 executed according to the embodiment of this invention.

FIG. 7 shows an example where the control unit 506 of the SVP 500a (SVP1) executes the DKC data acquisition program 30000.

The control unit 506 refers to the management DKC table 2100a to obtain an identifier ("DKC1") of the storage system 400a (DKC1) from which the SVP 500a (SVP1) obtains management data (Step 30010).

Then, the control unit 506 obtains data from the storage system 400a (DKC1) identified by the identifier obtained in Step 30010, and stores the obtained data in the DKC data repository 50000a (Step 30020).

Next, the control unit 506 refers to the stand-by SVP table 2200a to store the data of the storage system 400a (DKC1) obtained in Step 30010 in the DKC data repository 50000b of the SVPA (SVP 500b) which is a stand-by SVP (Step 30030). Then, the control unit 506 finishes the process.

<Active SVP Monitor Program 4000>

The active SVP monitor program 4000 is a program used by the stand-by SVP for monitoring an operation status of the active SVP. The active SVP monitor program 4000 is read from the storage device 512 by the control unit 506 of the SVP 500 to be executed. The active SVP monitor program 4000 is executed by the control unit 506 of the stand-by SVP in Step 3050 of the monitor program 3000. For example, the control unit 506 of the SVP 500b (SVPA) executes the active SVP monitor program 4000.

FIG. 8 is a flowchart showing a process of the active SVP monitor program 4000 executed according to the embodiment of this invention.

FIG. 8 shows an example where the control unit 506 of the SVP 500b (SVPA) shown in FIG. 3A executes the active SVP monitor program 4000. The same holds true for FIGS. 9A and 9B.

In Step 4010, the control unit 506 obtains "SVP1" set in the active SVP ID 2301b and "AddrS12" set in the SVP Addr2 2303b from the redundant configuration active SVP table 2300b.

In Step 4020, the control unit 506 requests the active SVP obtained in Step 4010 to make operation status response via the network 20. In this case, the control unit 506 uses SVP Addr2 "AddrS12" as a transmission destination of the request. The active SVP obtained in Step 4010 is an SVP 500a identified by an identifier SVP1. In the description below, for brevity, the SVP 500a identified by the identifier "SVP1" will be referred to as SVP1.

The control unit 506 judges whether a response to the request transmitted in Step 4020 has been received (Step 4030). When it is judged in Step 4030 that a response has been received, the process proceeds to Step 4040. On the other hand, if no response is judged to have been received, the process proceeds to Step 5010 of FIG. 9A. When there is a response, it means that the SVP1 is normally operated. When there is no response, it means that a failure has occurred in the SVP1. For example, the operation status response request and its response in Step 4020 are so-called "heartbeats" via the network 20.

When it is judged in Step 4030 that a response has been received, the control unit 506 judges whether a process has been completed for all the active SVP's of the redundant configuration active SVP table 2300b (Step 4040). When it is judged in Step 4040 that the process has been completed for all the active SVP's of the redundant configuration active SVP table 2300b, the control unit 506 finishes the process. On the other hand, if it is judged that there is an unprocessed active SVP in the redundant configuration active SVP table 2300b, the control unit 506 repeats the process of Step 4010 and the subsequent steps. In the example of the redundant configuration active SVP table 2300b, only one active SVP (i.e., SVP1) is set. Thus, in this example, after processing the SVP1, the process is finished.

Figure 9A:
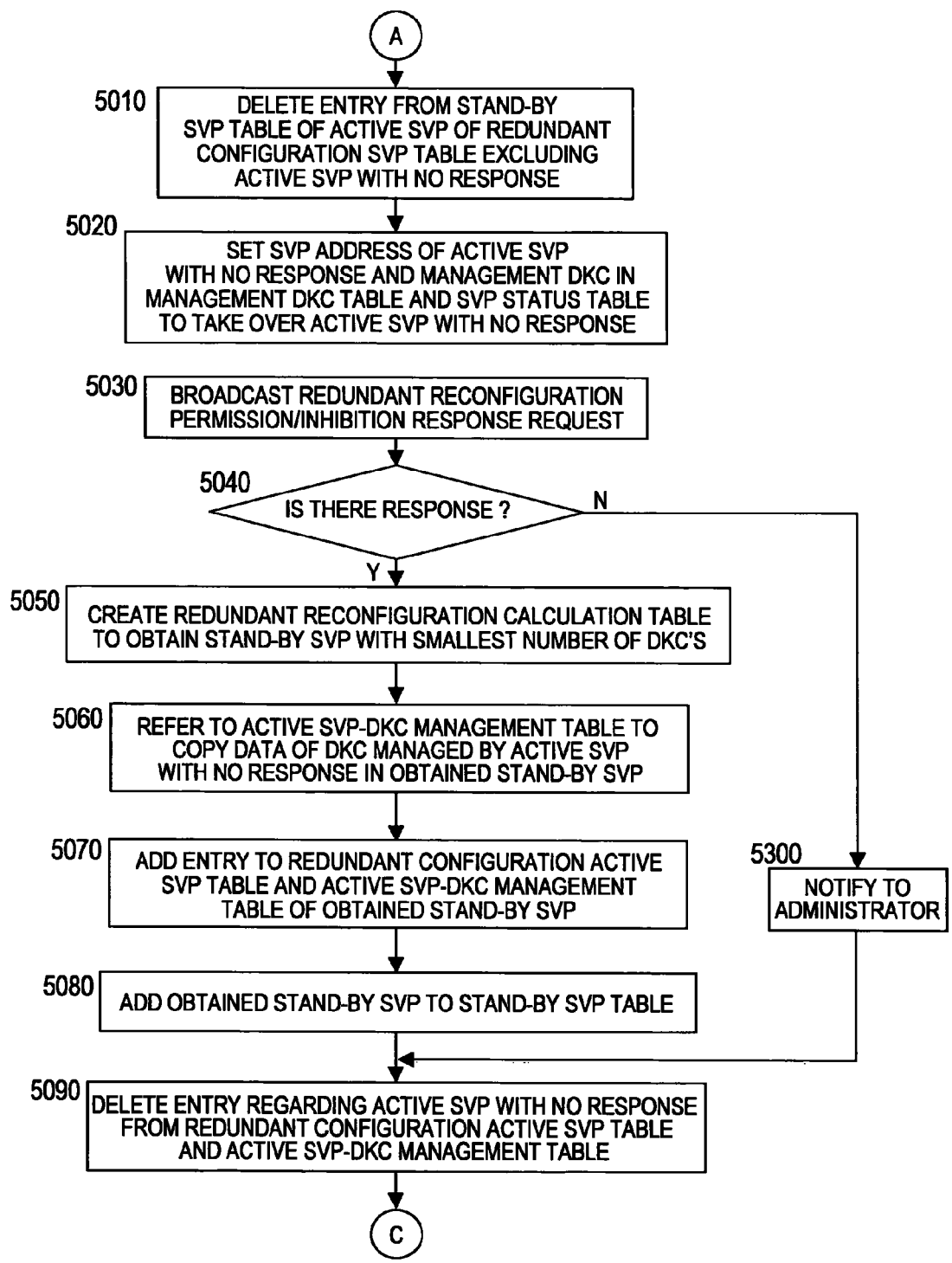
FIGS. 9A and 9B are flowcharts showing a process executed when a failure occurs in the active SVP among processes of the active SVP monitor program executed according to the embodiment of this invention.
Figure 9B:
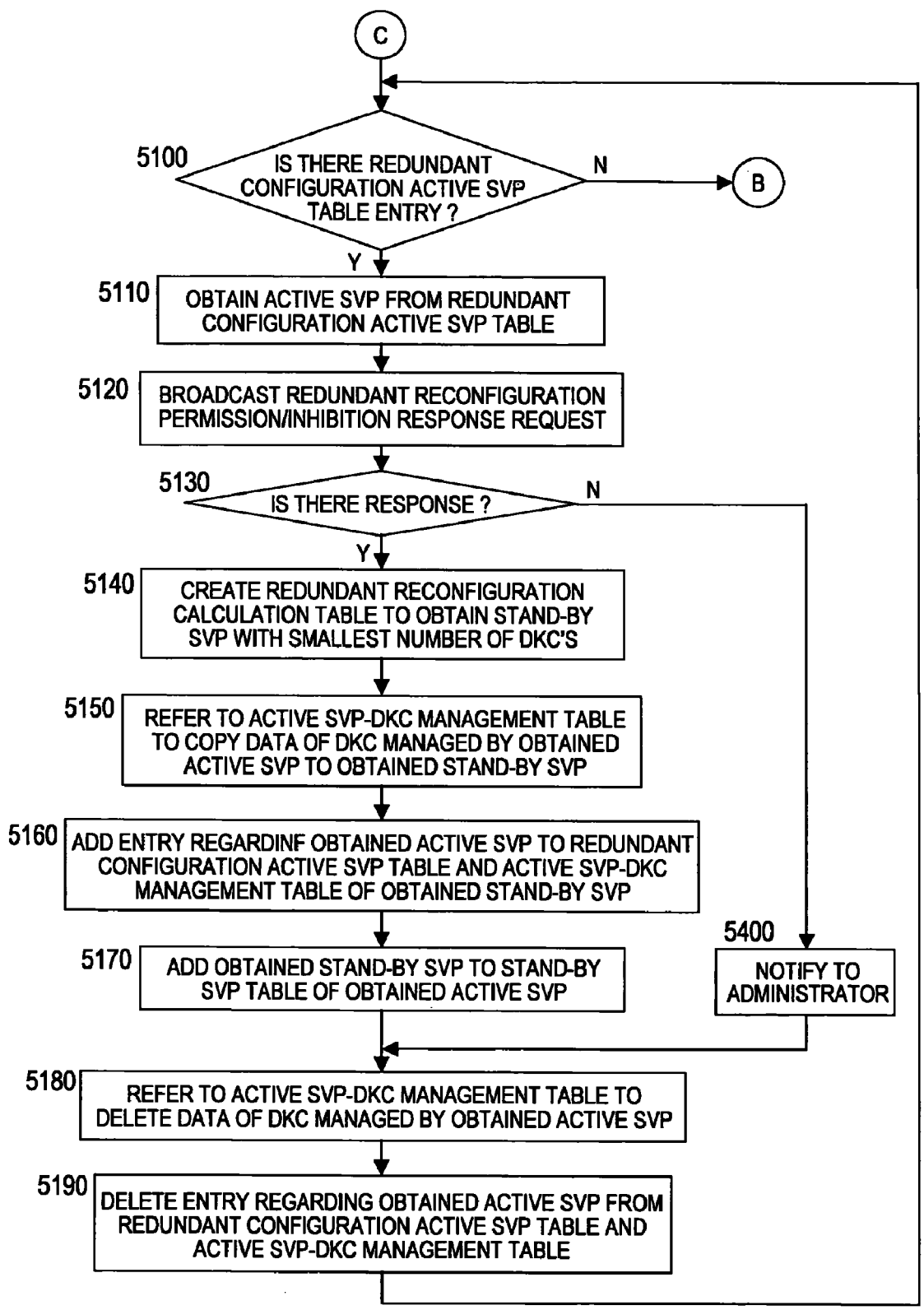

FIGS. 9A and 9B are flowcharts showing a process executed when a failure occurs in the active SVP among processes of the active SVP monitor program 4000 executed according to the embodiment of this invention.

When it is judged in Step 4030 of FIG. 8 that no response has been received, the process proceeds to Step 5010 of FIG. 9A.

In Step 5010, the control unit 506 deletes an entry regarding its own SVP 500 (SVP 500 executing the active SVP monitor program 4000) from the stand-by SVP table 2200 held by the active SVP other than the active SVP that has not responded in Step 4030 among the active SVP's set in the redundant configuration SVP table 2300b (Step 5010). The entry regarding the own SVP 500 is an entry in which an identifier of the own SVP 500 is set as a stand-by SVP_ID 2201.

Step 5010 is executed by transmission of a request of deleting the entry to the active SVP from the own SVP 500. The active SVP that has received the request executes deletion of the requested entry.

When the active SVP which has made no response in Step 4030 is failed over to the stand-by SVP, the stand-by SVP becomes a new active SVP and is no longer a stand-by SVP of the other active SVP (in other words, the new active SVP can no longer take over the other active SVP 500). Accordingly, the entry regarding the own SVP 500 is deleted from the stand-by SVP table 2200 of the other active SVP. As only one active SVP is set in the redundant configuration active SVP table 2300b, the control unit 506 of the SVP 500b (SVPA) shown in FIG. 3A deletes no entry of stand-by SVP table 2200 in Step 5010.

To describe Step 5010, SVP 500f (SVPC) of FIG. 3A will be taken as an example. The SVP 500f (SVPC) is a stand-by SVP where two active SVP's, SVP 500e (SVP3) and SVP 500g (SVP4), are made redundant. In other words, when a failure occurs in one of the SVP 500e (SVP3) and the SVP 500g (SVP4), the SVP 500 where the failure has occurred fails over to the SVP 500f (SVPC).

In the SVP 500f (SVPC), the active SVP monitor program 4000 is executed. When it is judged in Step 4030 that no response has been received from the SVP 500e (SVP3), in Step 5010, the SVP 500f (SVPC) refers to a redundant configuration active SVP table 2300f. Though not shown, it can be understood that the redundant configuration active SVP table 2300f is a table held by the SVP 500f from an index "f". An index after a number of a table (e.g., "e" or "g") indicates an SVP 500 holding the table.

At the point of time of executing Step 5010, the redundant configuration active SVP table 2300f includes two entries. In the active SVP ID 2301 of the two entries, "SVP3" and "SVP4" are set.

On the other hand, a stand-by SVP table 2200e held by the SVP 500e (SVP3) includes only one entry. In the stand-by SVP ID 2201 of the entry, "SVPC" is set. Similarly, a stand-by SVP table 2200g held by the SVP 500g (SVP4) includes only one entry. "SVPC" is set in the stand-by SVP ID 2201 of the entry.

The SVP 500f (SVPC) deletes an entry including SVPC which is an identifier of its own SVP 500 from the stand-by SVP table 2200g of the SVP 500g (SVP4) which is an active SVP other than the SVP 500e (SVP3) which has made no response.

As a result of Step 5010, the entry including the identifier of the own SVP 500 is deleted from the stand-by SVP table 2200 of all the active SVP's excluding the active SVP where a failure has occurred among the active SVP's included in the redundant configuration 700 to which the own SVP 500 belongs.

The process of Step 5020 and the subsequent steps will be described by taking the example of the SVP 500b (SVPA) again.

In Step 5020, the control unit 506 of the SVP 500b (SVPA) refers to the redundant configuration active SVP table 2300b to obtain an address "AddrS11" of the active SVP1 which has made no response in Step 4030. Then, the control unit 506 sets the obtained address "AddrS11," in the SVP Addr1 2302b of the SVP status table 2500b. In addition, the control unit 506 refers to the active SVP-DKC management table 2400b to set an identifier and an address of the storage system 400 managed by the active SVP1 which has made no response in Step 4030 in the management DKC table 2100b. Specifically, the active SVP1 has managed the storage system 400a identified by an identifier "DKC1". Accordingly, the control unit 506 sets "DKC1" and "AddrD1" set in the DKC ID 2402b and DKC Addr 2403b corresponding to the identifier "DKC1" in the DKC_ID 2101b and the DKC Addr 2102b of the management DKC table 2100b, respectively. Further, the control unit 506 sets the status 2504b of the SVP status table 2500b to "active", and the reconfiguration permission/inhibition 2505b to "inhibited". Thus, the operation of the active SVP1 which has made no response in Step 4030 is taken over by the SVP 500b (SVPA).

Before execution of the failover, the management computer 600 has accessed the active SVP1 by using the address "AddrS11". Then, after the execution of the failover, in Step 5020, the SVP 500b (SVPA) takes over the address "AddrS11" of the active SVP1 with no response. As a result, the management computer 600 can access the SVP 500b (SVPA) by using the same address "AddrS11" as that used before the execution of the failover. In other words, the failover is executed in a transparent manner.

The control unit 506 broadcasts a redundant reconfiguration permission/inhibition request via the network 20 (Step 5030).

Then, the control unit 506 judges whether there is a response to the request transmitted in Step 5030 (Step 5040). When it is judged that there is a response to the request, the process proceeds to Step 5050. On the other hand, if it is judged that there is no response, the process proceeds to Step 5300.

When it is judged in Step 5040 that there is no response, a stand-by SVP that can make its own SVP 500 (i.e., SVP 500b (SVPA) in this example) redundant does not exist in the computer system 1. In other words, in this case, the own SVP 500 is a single point of failure (SPOF). Accordingly, the control unit 506 notifies the SPOF to the administrator (Step 5300) and proceeds to Step 5090. In Step 5300, for example, a failure status is displayed on the management computer 600 used by the administrator, and an electronic mail is transmitted to the administrator.

When it is judged in Step 5040 that there is a response, the control unit 506 creates a redundant configuration calculation table 2600b to obtain a stand-by SVP with a smallest number of DKC's (Step 5050).

Referring to FIG. 10, the redundant reconfiguration calculation table 2600b created by the SVP 500b in Step 5050 will be described. The redundant reconfiguration calculation table 2600b is a redundant reconfiguration calculation table 2600 created by the SVP 500b.

FIG. 10 is an explanatory diagram of the redundant reconfiguration calculation table 2600 according to the embodiment of this invention.

The response to the redundant reconfiguration permission/inhibition response request contains SVP ID which is an identifier of the SVP 500 that has made a response, an address Addr2 of the second interface, the number of active SVP's made redundant by the SVP 500 that has made the response, and the number of DKC's which is the number of storage systems 400 managed by the active SVP's. A redundant reconfiguration permission/inhibition response program 8000 will be described later with reference to FIG. 13.

For example, it is presumed that responses have been made from SVP 500*d* (SVPB), SVP 500*f* (SVPC), and SVP500*k* (SVPD) which are stand-by SVP's. The redundant reconfiguration calculation table 2600*b* includes SVP ID 2601*b*, Addr2 2602*b*, the number of active SVP's 2603*b*, the number of DKC's 2604*b*, and the installation floor number 2605*b*.

As shown in FIG. 3A, the SVP 500*d* (SVPB) is identified by the identifier "SVPB". The SVP 500*d* (SVPB) makes one active SVP (i.e., SVP 500*c* (SVP2)) redundant. The SVP 500*c* (SVP2) manages one storage system 400 (i.e., storage system 400*b* (DKC2)). Further, in this example, it is presumed that the address Addr2 of the second interface of the SVP 500*d* (SVPB) is "AddrSB2", and the SVP 500*d* (SVPB) is installed on the fourth floor. In this case, the SVP 500*d* (SVPB) returns "SVPB" as SVP ID, "AddrSB2" as Addr2, "1" as the number of active SVP's, "1" as the number of DKC's, and "4" as the installation floor number as a response. These are stored in columns 2601*b* to 2605*b* of the redundant reconfiguration calculation table 2600*b*.

Values contained in responses from the SVP 500*f* (SVPC) and the SVP 500*k* (SVPD) are similarly stored in the redundant reconfiguration calculation table 2600*b*. The stand-by SVP selected in Step 5050 is an SVP 500*d* (SVPB) having a smallest number of DKC's 2604*b*.

In effect, the number of DKC's 2604*b* is the number of storage systems 400 which are data acquisition sources held in the DKC data repository by the stand-by SVP. For example, as shown in FIG. 3A, the SVP 500*d* (SVPB) holds management data obtained by the SVP 500*c* (SVP2) from the storage system 400*b* (DKC2) in the DKC data repository 50000*d*. Accordingly, the number of storage systems 400 as data acquisition sources held by the SVP 500*d* (SVPB) is "1". On the other hand, the SVP 500*f* (SVPC) holds management data obtained by the SVP 500*e* (SVP3) from the storage system 400*c* (DKC3) and management data obtained by the SVP 500*g* (SVP 4) from the storage system 400*d* (DKC4) in the DKC data repository 50000*f*. Thus, the number of storage systems 400 as data acquisition sources held by the SVP 500*f* (SVPC) is "2".

Referring again to FIG. 9A, the process of Step 5060 and the subsequent steps will be described.

The control unit 506 of the SVPA (SVP 500*b*) refers to the active SVP-DKC management table 2400*b*. As a result, the control unit 506 can see that the SVP1 as an active SVP that has made no response in Step 5040 has managed the storage system 400*a* (DKC1), in other words, the SVP1 has obtained data from the storage system 400*a* (DKC1). Accordingly, the control unit 506 copies the data obtained from the storage system 400*a* (DCK 1) by the SVP1 from the DKC data repository 50000*b* of the SVPA (SVP 500*b*) to the DKC data repository 50000*d* of the SVPB (SVP 500*d*) (Step 5060). The SVPB (SVP 500*d*) is a stand-by SVP selected in Step 5050. The copy of the data obtained from the storage system 400*a* (DKC1) by the SVP1 is a copy that has been stored in the DKC data repository 50000*b* of the SVPA (SVP 500*b*) in Step 30030 of FIG. 7.

Copying of data among the SVP's 500 is carried out by transfer of data by the SVP 500 via the interface 504 and the network 20. Alternatively, data may be transferred via the interface 502 and the network 10.

Then, the control unit 506 of the SVPA (SVP 500*b*) adds an entry to the redundant configuration active SVP table 2300*d* and the active SVP-DKC management table 2400*d* of the SVPB (SVP 500*d*) which is a stand-by SVP selected in Step 5050 (Step 5070).

Specifically, the control unit 506 refers to the management DKC table 2100*b* and the SVP status tale 2500*b* set in Step 5020. As a result, the control unit 506 can see that an identifier of its own SVP 500 is "SVPA", and the own SVP 500 will manage the storage system 400*a* (DKC1) (in other words, own SVP 500 take over the management of the storage system 400*a* (DKC1) from the SVP1). Then, the control unit 506 adds an entry containing the SVPA as an active SVP ID 2301*d* to the redundant configuration active SVP table 2300*d*. Further, the control unit 506 adds an entry containing the SVPA and the DKC1 as active SVP ID 2401*d* and DKC ID 2402*d*, respectively.

For example, the addition of these entries is executed by transmitting an instruction of addition from the SVPA (SVP 500*b*) to the SVPB (SVP 500*d*). The control unit 506 of the SVPB (SVP 500*d*) that has received the instruction adds the entries according to the instruction. As a result, as can be seen from FIG. 11, entries regarding the SVPA and the DKC1 are added to the redundant configuration active SVP table 2300*d* and the active SVP-DKC management table 2400*d* of the SVPB which is a stand-by SVP of the SVPA.

That is, as a result of the execution of Step 5070, the control unit 506 of the SVPB (SVP 500*d*) can see that its own SVP 500 has made the SVPA (SVP 500*b*) redundant, in other words, when a failure occurs in the SVPA (SVP 500*b*), the own SVP 500 has to take over the management of the storage system 400*a* (DKC1) from the SVPA (SVP 500*b*).

Then, the control unit 506 of the SVPA (SVP 500*b*) adds an identifier "SVPB" of the stand-by SVP selected in Step 5050 to the stand-by SVP table 2200*b* (Step 5080).

Through the aforementioned process, the operation of the SVP1 which has made no response in Step 4030 is taken over to the SVPB (SVP 500*d*), and the redundant configuration 700 is reconfigured. FIG. 3B shows a status where, after the SVPA takes over the SVP1 where a failure occurs, the redundant configuration 700 having the SVPB as a stand-by SVP is reconfigured. The SVPA (SVP 500*b*) manages the DKC1, the SVP2 manages the DKC2, and the SVPA and the SVP2 are made redundant by the SVPB.

Accordingly, when a failure occurs in the SVP1, the SVP1 is failed over to the SVPA (SVP 500*b*), which starts to operate as a new active SVP. Thus, the redundant configuration 700*a* to which the SVPA (SVP 500*b*) belongs no longer includes a stand-by SVP. In this case, the redundant configuration 700 is reconfigured to include one or more stand-by SVP's. Specifically, the redundant configuration 700*a* including the SVP1 and the SVPA (SVP 500*b*) and the redundant configuration 700*b* including the SVP2 (SVP 500*c*) and the SVPB (SVP 500*d*) are released, and a new redundant configuration 700*e* including these four SVP's 500 is configured. The redundant configuration 700*e* includes two active SVP's (SVPA (SVP 500*b*) and SVP2 (SVP 500*c*)) and one stand-by SVP (SVPB (SVP 500*d*)) which makes the active SVP's redundant.

FIG. 11 is an explanatory diagram of a table held by the SVP 500*d* (SVPB) which is a stand-by SVP after the redundant configuration is reconfigured according to the embodiment of this invention.

Specifically, FIG. 11 shows a management DKC table 2100*d*, a stand-by SVP table 2200*d*, a redundant configuration active SVP table 2300*d*, an active SVP-DKC management table 2400d, and an SVP status table 2500d, which are held by the SVPB (SVP 500d). An outline of contents managed by these tables is as described above with reference to FIGS. 4 and 5. Specific values set in the tables in the SVPB (SVP 500d) of the redundant configuration 700e of the example will be described below.

As the SVPB (SVP 500d) is a stand-by SVP, the management DKC table 2100d and the stand-by SVP table 2200d include no entries.

The SVPB (SVP 500d) makes two SVP's redundant. Accordingly, the redundant configuration active SVP table 2300d includes two entries.

"SVP2", "AddrS21", "AddrS22", "Y", and "1" are set in the active SVP ID 2301d, the SVP Addr1 2302d, the SVP Addr2 2303d, the monitor 2304d, and the number of DKC's 2305d of the first entry, respectively.

The "SVP2" is an identifier of the SVP2 (SVP 500c) made redundant by the SVPB (SVP 500d). The "AddrS21" is an address of the first interface 502 of the SVP2 (SVP 500c). The "AddrS22" is an address of the second interface 504 of the SVP2 (SVP 500c). The value "Y" of the monitor 2304d indicates that the SVPB (SVP 500d) monitors the SVP2 (SVP 500c). As the SVP2 (SVP 500c) manages only one storage system 400b (DKC2), "1" is set in the number of DKC's 2305d.

"SVPA", "AddrS11", "AddrSA2", "Y", and "1" are set in the active SVP ID 2301d, the SVP Addr1 2302d, the SVP Addr2 2303d, the monitor 2304d, and the number of DKC's 2305d of the second entry, respectively.

The "SVPA" is an identifier of the SVPA (SVP 500b) made redundant by the SVPB (SVP 500d). The "AddrS11" is an address of the first interface 502 of the SVPA (SVP 500b). This "AddrS11" is the same address as that set in the failed SVP1 (refer to Step 5020 of FIG. 9A). The "AddrSA2" is an address of the second interface 504 of the SVPA (SVP 500b). The value "Y" of the monitor 2304d indicates that the SVPB (SVP 500d) monitors the SVPA (SVP 500b). As the SVPA (SVP 500b) manages only one storage system 400a (DKC1), "1" is set in the number of DKC's 2305d.

The SVPB (SVP 500d) makes two SVP's 500 redundant. Each SVP 500 manages one storage system. Accordingly, the active SVP-DKC table 2400d includes two entries.

"SVP2", "DKC2", and "AddrD2" are set in the active SVP ID 2401d, the DKC ID 2402d, and the DKC Addr 2403d of the first entry, respectively.

The "SVP2" is an identifier of the SVP2 (SVP 500c) made redundant by the SVPB (SVP 500d). The "DKC2" is an identifier of the storage system 400b (DKC2) managed by the SVP2 (SVP 500c). The "AddrD2" is an address of the interface 490 of the storage system 400b (DKC2).

"SVPA", "DKC1", and "AddrD1" are set in the active SVP ID 2401d, the DKC ID 2402d, and the DKC Addr 2403d of the second entry, respectively.

The "SVPA" is an identifier of the SVPA (SVP 500b) made redundant by the SVPB (SVP 500d). The "DKC1" is an identifier of the storage system 400a (DKC1) managed by the SVPA (SVP 500b). The "AddrD1" is an address of the interface 490 of the storage system 400a (DKC1).

The SVP status table 2500d is an SVP status table 2500 held by the SVPB (SVP 500d). In the SVP ID 2501d, the SVP Addr1 2502d, and the SVP Addr2 2503d, "SVPB" which is an identifier of the SVPB (SVP 500d), an address "AddrSB1" of the first interface 502 of the SVPB (SVP 500d), and an address "AddrSB2" of the second interface 504 are set, respectively. In the status 2504d, "stand-by" indicating that the SVPB (SVP 500d) operates as a stand-by SVP is set. In the reconfiguration permission/inhibition 2505d, "permitted" indicating that a response is made to a reconfiguration request is set. In the installation floor number 2506d, "4" is set. This means that the SVPB (SVP 500d) is installed on the fourth floor.

As a result of reconfiguring the redundant configuration 700, the table held by the SVPA (500b) which is a new active SVP is updated as follows.

The DKC ID 2101b and the DKC Addr 2102b of the DKC management table 2100b are updated to "DKC1" and "AddrD1", respectively. These are the same as those set in the failed SVP1.

The stand-by SVP ID 2201b, the SVP Addr2 2202b, and the monitor 2203b of the stand-by SVP table 2200b are updated to "SVPB", "AddrSB2", and "Y". The "SVPB" and the "AddrSB2" are an identifier and an address of the new stand-by SVP (which takes over the SVPA (500b) when a failure occurs in the SVPA (500b)).

As a result of deleting entries, the redundant configuration active SVP table 2300b and the active SVP-DKC management table 2400b no longer include any entries.

The SVP Addr1 2502b, the status 2504b, and the reconfiguration permission/inhibition 2505b of the SVP status table 2500b are updated to "AddrS11", "active", and "inhibited", respectively.

Referring again to FIGS. 9A and 9B, the process of Step 5090 and the subsequent steps will be described.

As in the case of the SVPC (SVP 500f) of FIGS. 3A and 3B, one stand-by SVP may make a plurality of active SVP's redundant. In such a case, when the stand-by SVP takes over one active SVP, there are no longer stand-by SVP's which make redundant the remaining active SVP's of the redundant configuration 700. In other words, the remaining active SVP's are SPOF's. In this case, the SVP 500 which becomes a new active SVP as a result of the failover reconfigures the redundant configuration 700 to prevent the remaining active SVP's from becoming SPOF's.

In the example of FIG. 3A, as the SVPA has not made the active SVP other than the SVP1 redundant, this process is not carried out. An example of the SVPC (500f) will be described hereinafter. Specifically, an example where, in FIG. 3A, a failure occurs in the SVP3 (SVP 500e), the SVPC (SVP 500f) takes over the SVP3, and the SVPB (SVP 500d) is selected as a stand-by SVP of the SVPC will be described. In this case, by the following process, the redundant configuration 700 which includes a stand-by SVP for making redundant an SVP4 (SVP 500g) as a remaining active SVP is reconfigured.

Tables held by the SVP3 (SVP 500e), the SVP4 (SVP 500g), the SVPC (SVP 500f), and the SVPD (SVP 500k) are not shown in the figure. In the description below, which SVP 500 hold these tables will be identified by indexes of "e", "g", "f", and "k" added to the tail ends of names of the tables.

The control unit 506 of the SVPC (SVP 500f) deletes entries regarding the SVP3 (SVP 500e) as an active SVP which has made no response in Step 4030 from the redundant configuration active SVP table 2300f and the active SVP-DKC management table 2400f (Step 5090).

Then, the control unit 506 refers to the redundant configuration active SVP table 2300f to judge whether there is any entry in the redundant configuration active SVP table 2300f (Step 5100). When it is judged that there is an entry in the redundant configuration active SVP table 2300f, the process proceeds to Step 5110. When it is judged that there is no entry, the process is finished (B).

When it is judged in Step 5100 that there is an entry, the stand-by SVP that takes over the failed active SVP is also a stand-by SVP for the active SVP other than the failed active SVP (i.e., the active SVP which has made no response in Step 4030). In other words, the redundant configuration 700 to which the stand-by SVP that takes over the failed active SVP belongs includes an active SVP made redundant by the stand-by SVP in addition to the failed active SVP. For example, the redundant configuration 700c includes the SVP4 (SVP 500g) made redundant by the SVPC (SVP 500f) in addition to the SVP3 (SVP 500e) where a failure has occurred. In this case, for these active SVP's, the redundant configuration 700 is reconfigured. In other words, as there is an entry regarding the SVP4 in the redundant configuration active SVP table 2300f even after the entry regarding the SVP3 (SVP 500e) is deleted, the process proceeds to the Step 5110. Then, for the SVP4 (SVP 500g), the redundant configuration 700 is reconfigured. At this point of time, the SVPC (SVP 500f) which has taken over the SVP3 (SVP 500e) has been made redundant by the SVPB (SVP 500d), while the SVP4 (SVP 500g) has not been made redundant.

The control unit 506 of the SVPC (SVP 500f) obtains an "SVP4" which is an identifier of the active SVP from the redundant configuration active SVP table 2300f (Step 5110). Then, the control unit 506 broadcasts a redundant reconfiguration permission/inhibition request via the network 20 (Step 5120).

The control unit 506 judges whether there is a response to the request of Step 5120 (Step 5130). When it is judged in Step 5130 that there is a response, the process proceeds to Step 5140. When it is judged that there is no response, the process proceeds to Step 5400.

When it is judged in Step 5130 that there is no response, the SVP4 (SVP 500g) which is an active SVP cannot be made redundant. In other words, the SVP4 (SVP 500g) is an SPOF. In this case, the control unit 506 notifies the administrator of the SPOF (Step 5400) and proceeds to Step 5180. To notify the administrator, a failure status may be displayed on the management computer 600 used by the administrator, and an electronic mail may be sent to the administrator.

When it is judged in Step 5130 that there is a response, a redundant reconfiguration calculation table 2600f is created based on the received response, and a stand-by SVP having a smallest number of DKC's is selected (Step 5140).

For example, it is presumed that the SVPA (SVP 500b), the SVPB (SVP 500d), and the SVPD (SVP 500k) have responded to a request from the SVPC (SVP 500f) in Step 5120, and the SVPD (SVP 500k) has been selected in Step 5140.

The control unit 506 of the SVPC (SVP 500f) refers to the active SVP-DKC management table 2400f. As a result, the control unit 506 can see that the SVP4 (SVP 500g) as the active SVP obtained in Step 5110 is managing the storage system 400d (DKC4). Accordingly, the control unit 506 copies data obtained from the storage system 400d (DKC4) by the SVP4 (SVP 500g) from the DKC data repository 50000g of the SVP4 (SVP 500g) to the DKC data repository 50000k of the SVPD (SVP 500k) as the stand-by SVP selected in Step 5140 (Step 5150).

The control unit 506 of the SVPC (SVP 500g) adds entries regarding the SVP4 (SVP 500g) as the active SVP obtained in Step 5110 to the redundant configuration active SVP table 2300k and the active SVP-DKC management table 2400k of the SVPD (SVP 500k) as the stand-by SVP selected in Step 5140 (Step 5160). In other words, the entries regarding the SVP4 and the DKC 4 are added to the redundant configuration active SVP table 2300k and the active SVP-DKC management table 2400k of the SVPD which is a stand-by SVP for the SVP4. This addition is carried out by the same method as that in Step 5070.

Then, the control unit 506 changes the entry of the stand-by SVP table 2200g of the SVP4 (SVP 500g) as the active SVP obtained in Step 5110 to an entry regarding the SVPD (SVP 500k) as the stand-by SVP selected in Step 5140 (Step 5170). In other words, the control unit 506 changes the SVPC set as the stand-by SVP for the SVP4 to an SVPD.

The control unit 506 refers to the active SVP-DKC management table 2400f to delete the data obtained from the storage system 400d (DKC4) managed by the SVP4 as the active SVP obtained in Step 5110 from the DKC data repository 50000f (Step 5180).

The control unit 506 deletes the entries regarding the SVP4 (SVP 500g) as the active SVP obtained in Step 5110 from the redundant configuration active SVP table 2300f and the active SVP-DKC management table 2400f (Step 5190).

In Step 5140, the stand-by SVP having a smallest number of DKC's is obtained to reconfigure the redundant configuration 700, and thus the data obtained from the storage system 400 and stored for redundancy by the stand-by SVP is dispersed substantially equally to the stand-by SVP's. Accordingly, loads of the stand-by SVP are generally balanced.

A capacity of data stored in the DKC data repository 50000 of the SVP 500 is finite. Thus, when an amount of data stored in the DKC data repository 50000 exceeds a predetermined value, pieces of data are deleted from old data. As the number of storage systems 400 from which the SVP 500 obtains data increases, a capacity of the DKC data repository 50000 allocated to store data from one storage system 400 becomes smaller. Accordingly, such an SVP 500 cannot hold the data obtained from the storage system 400 for a long time. By properly dispersing the data obtained from the storage system 400 to the SVP's 500, a data amount of one storage system 400 to be stored in the DKC data repository 50000 of a finite capacity can be increased (in other words, storage period of data can be made longer).

In Step 5050 or 5140, when there are a plurality of stand-by SVP's having a smallest number of DKC's, a stand-by SVP installed in a position geographically near a new active SVP may be selected. The geographical position may be represented by any coordinates. For example, when SVP's 500 included in the computer system 1 are installed on a plurality of floors of one building, the stand-by SVP of a closest installation floor number may be selected. As described above, by selecting the geographically near stand-by SVP, when a work of directly handling the SVP device, such as maintenance of the SVP 500 itself, is necessary, time and labor of movement of a worker among the plurality of SVP's 500 included in the redundant configuration 700 can be removed.

<Stand-by SVP Monitor Program 6000>

The stand-by SVP does not manage the storage system 400. However, when a failure occurs in the stand-by SVP, failover cannot be carried out when a failure occurs in the active SVP thereafter. In other words, when a failure occurs in the stand-by SVP, the active SVP made redundant by the stand-by SVP becomes an SPOF. Accordingly, the active SVP has to monitor the stand-by SVP to reconfigure the redundant configuration 700 when a failure occurs in the stand-by SVP.

The stand-by SVP monitor program 6000 is a program used by the active SVP for monitoring an operation status of the stand-by SVP. The stand-by SVP monitor program 6000 is read from the storage device 512 to be executed by the control unit 506 of the SVP 500. The stand-by SVP monitor program 6000 is executed in Step 3030 of the monitor program 3000 by the control unit 506 of the active SVP. For example, the program is executed by the control unit 506 of the SVP 500a (SVP1) of FIG. 3A.

Figure 12:
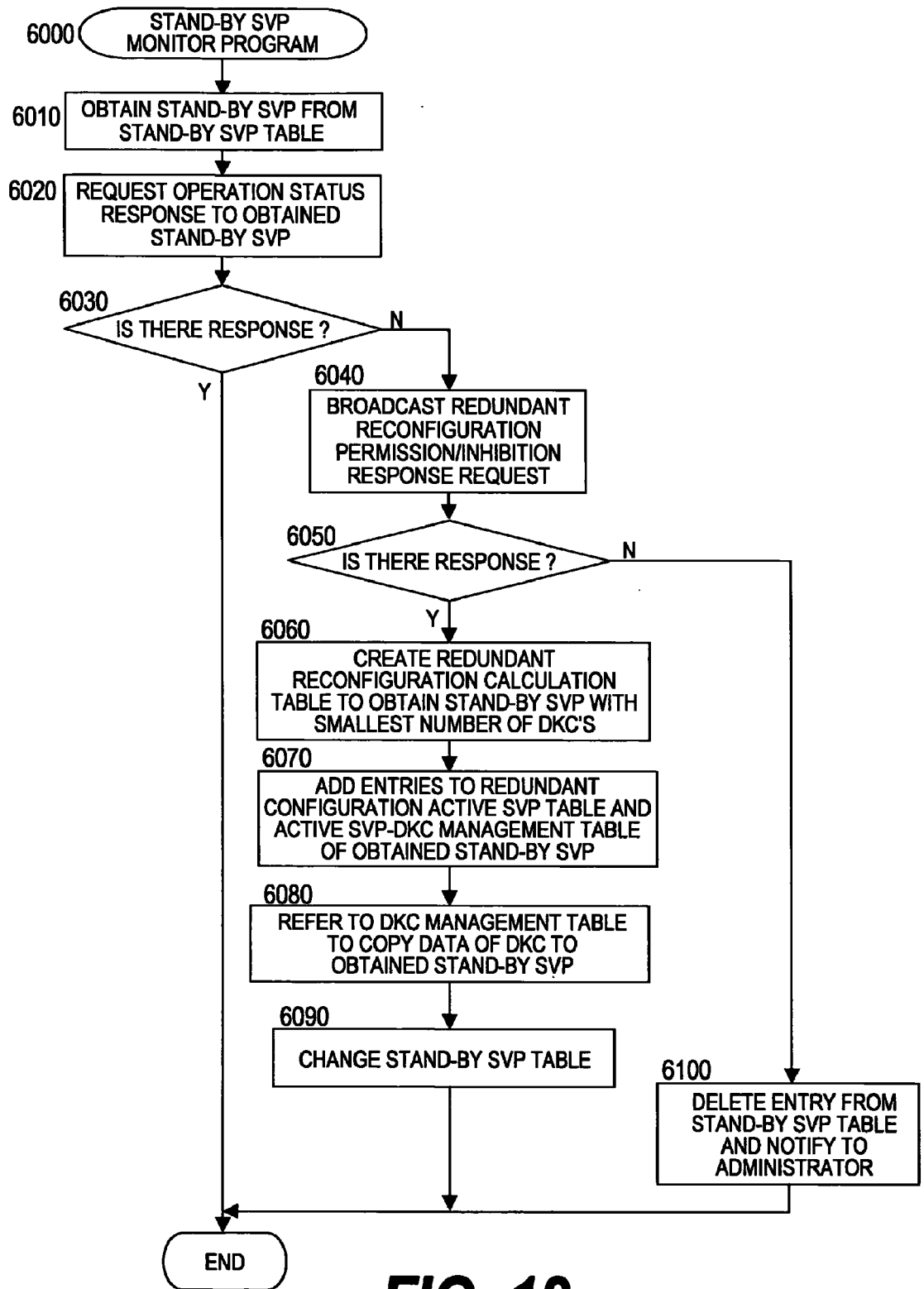
FIG. 12 is a flowchart showing a process of the stand-by SVP monitor program according to the embodiment of this invention.

FIG. 12 is a flowchart showing a process of the stand-by SVP monitor program 6000 according to the embodiment of this invention.

An example where the program is executed by the control unit 506 of the SVP 500a (SVP1) will be described.

First, in Step 6010, the control unit 506 obtains an identifier of the stand-by SVP, i.e., SVPA (SVP 500b), from the stand-by SVP table 2200a.

The control unit 506 requests an operation status response to the SVPA (SVP 500b) which is the stand-by SVP obtained in Step 6010 (Step 6020).

The control unit 506 judges whether there is a response to the request of the Step 6020 (Step 6030). When it is judged that there is a response to the request of the Step 6020, the SVPA (SVP 500b) as the stand-by SVP obtained in Step 6010 is being normally operated. In this case, as it is not necessary to reconfigure the redundant configuration 700, the control unit 506 finishes the process. For example, the operation status response request and the response are so-called "heartbeats" via the network 20.

When it is judged in Step 6030 that there is no response, a failure has occurred in the SVPA (SVP 500b) as the stand-by SVP obtained in Step 6010. In this case, the control unit 506 broadcasts a redundant reconfiguration permission/inhibition request (Step 6040).

The control unit 506 judges whether there is a response to the redundant reconfiguration permission/inhibition request of the Step 6040 (Step 6050). When it is judged that there is a response to the redundant reconfiguration permission/inhibition response request of the Step 6040, the process proceeds to Step 6060. When it is judged that there is no response, the process proceeds to Step 6100.

When it is judged in Step 6050 that there is a response, the control unit 506 creates a redundant reconfiguration calculation table 2600a based on the response, and selects a stand-by SVP having a smallest number of DKC's 2604 (Step 6060). For example, it is presumed that the SVPB, SVPC, and the SVPD have responded to a request from the SVP1 (SVP 500a), and that the SVPB has been selected in Step 6060.

The control unit 506 adds an entry regarding the own SVP 500, i.e., the SVP1 (SVP 500a), and an entry regarding the storage system 400a (DKC1) managed by the own SVP 500 to the redundant configuration active SVP table 2300d and the active SVP-DKC management table 2400d of the SVPB (SVP 500d) as the stand-by SVP selected in Step 6060 (Step 6070). This addition may be carried out by the same method as in Step 5070 of FIG. 9A.

Then, the control unit 506 refers to the management DKC table 2100a. As a result, the control unit 506 can see that the own SVP 500 manages the storage system 400a (DKC1). The control unit 506 copies data obtained from the storage system 400a (DKC1) managed by the own SVP 500 from the DKC data repository 50000a to the DKC data repository 50000d of the SVPB (SVP 500d) as the stand-by SVP selected in Step 6060 (Step 6080).

Then, the control unit 506 changes the stand-by SVP ID 2201a of the stand-by SVP table 2200a from the SVPA (SVP 500b) as the stand-by SVP which has made no response in Step 6030 to the SVPB (SVP 500d) as the stand-by SVP selected in Step 6060 (Step 6090), and finishes the process.

When it is judged in Step 6050 that there is no response, the active SVP cannot be made redundant. In other words, the SVP1 (SVP 500a) as the active SVP is an SPOF. In this case, the control unit 506 deletes the entry regarding the SVPA (SVP 500a) as the stand-by SVP which has made no response in Step 6030 from the stand-by SVP table 2200a, and notifies the administrator of the SPOF (Step 6100). To notify the administrator, a failure state may be displayed on the management computer 600 used by the administrator, and an electronic mail may be sent to the administrator.

In Step 6050, the stand-by SVP having a smallest number of DKC's is obtained to reconfigure the redundant configuration 700, and thus the data obtained from the storage system 400 and stored for redundancy by the stand-by SVP is dispersed substantially equally to the stand-by SVP's. Accordingly, loads of the stand-by SVP are generally balanced.

As described above by referring to FIGS. 9A and 9B, a data amount of one storage system 400 stored in a limited storage volume can be increased (in other words, data storage period can be made longer).

As described above by referring to FIGS. 9A and 9B, in Step 6060, when there are a plurality of stand-by SVP's having a smallest number of DKC's, a stand-by SVP installed in a position geographically near a new active SVP may be selected. The geographical position may be represented by any coordinates. For example, when SVP's 500 included in the computer system 1 are installed on a plurality of floors of one building, the installation floor number 2506 of the SVP status table 2500 is compared with the installation floor number 2604 of the redundant reconfiguration calculation table to select the stand-by SVP of the same or a closest installation floor number. Accordingly, by selecting the geographically near stand-by SVP, when a work of directly handling the SVP device, such as maintenance of the SVP 500 itself, is necessary, time and labor of movement of a worker among the plurality of SVP's 500 included in the redundant configuration 700 can be removed.

<Redundant Reconfiguration Permission/Inhibition Response Program 8000>

The redundant reconfiguration permission/inhibition response program 8000 is read from the storage device 512 to be executed by the control unit 506 of the SVP 500.

The redundant reconfiguration permission/inhibition response program 8000 is executed by the control unit 506 when the SVP 500 receives a redundant reconfiguration permission/inhibition response request from the other SVP 500 via the network 20.

Figure 13:
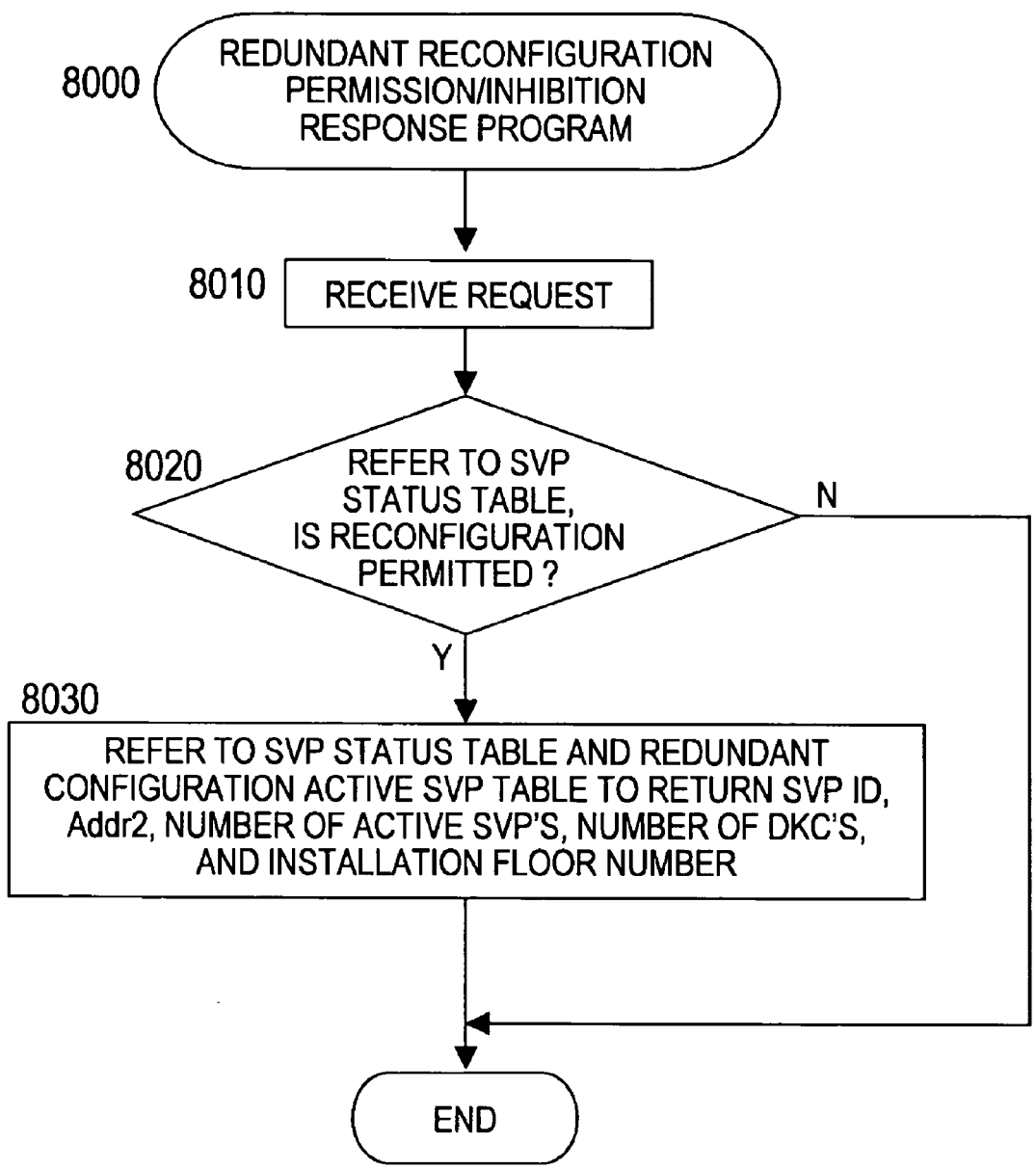
FIG. 13 is a flowchart showing a process of the redundant reconfiguration permission/inhibition response program according to the embodiment of this invention.

FIG. 13 is a flowchart showing a process of the redundant reconfiguration permission/inhibition response program 8000 according to the embodiment of this invention.

The control unit 506 receives the redundant reconfiguration permission/inhibition response request in Step 8010.

The control unit 506 refers to the reconfiguration permission/inhibition 2505 of the SVP status table 2500 to judge whether reconfiguration is permitted (Step 8020).

When it is judged in Step 8020 that the reconfiguration permission/inhibition 2505 of the SVP status table 2500 is "inhibited", the control unit 506 finishes the process.

When it is judged in Step 8020 that the reconfiguration permission/inhibition 2505 of the SVP status table 2500 is "permitted", the control unit 506 refers to the SVP ID 2501, the SVP Addr2 2503, and the installation floor number 2506 of the SVP status table 2500 and the redundant reconfiguration active SVP table 2300, and returns the information referred to and a total of the numbers of active SVP's and DKC's 2305 to a request source (Step 8030), and finishes the process. The number of active SVP's is the number of entries included in the redundant configuration active SVP table 2300. The total of the number of DKC's 2305 is a total value of the number of DKC's 2305 of the entry included in the redundant configuration active SVP table 2300.

An example where the control unit 506 of the SVP 500b executes the redundant reconfiguration permission/inhibition response program 8000 will be described. In this case, in Step 8030, the control unit 506 refers to the SVP status table 2500*b* to return the SVPA as the SVP ID 2501, the AddrSA2 as the SVP Addr2 2503, and 3 as the installation floor number 2506 in response. Further, the control unit 506 refers to the redundant configuration active SVP table 2300*b* to return 1 as the total number of active SVP's and 1 as the total number of DKC's in response.

The total number of active SVP's and DKC's is plural when the stand-by SVP makes a plurality of active SVP's redundant. For example, in the case of the SVP 500*f* (SVPC) of FIG. 3A, the total number of active SVP's is 2, and the total number of DKC's is 2.

When there is no entry in the redundant configuration active SVP table 2300, the total numbers of active SVP's and DKC's are both 0.

<Logical Diagram 2>

Figure 14A:
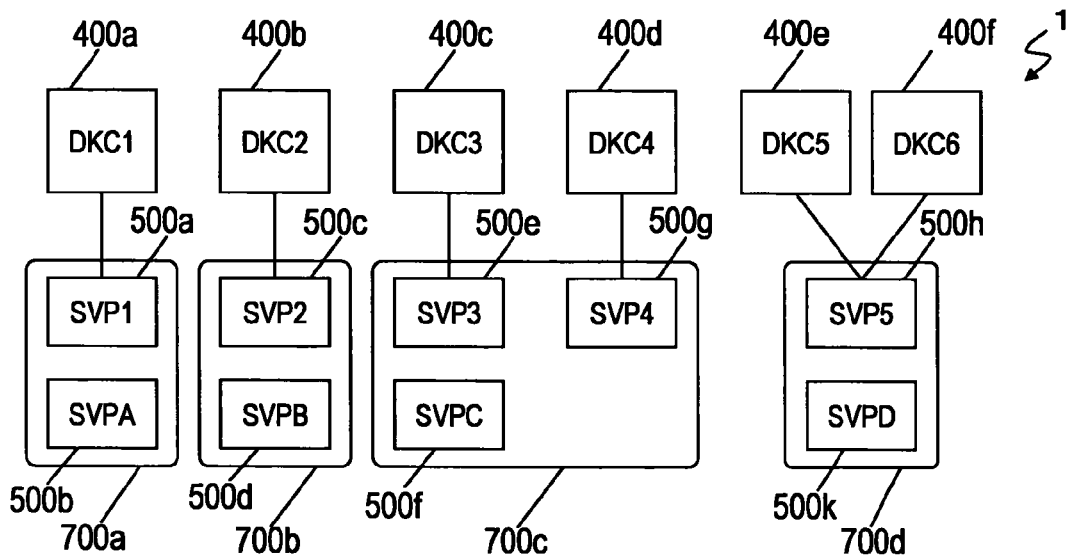
FIGS. 14A to 14C are explanatory diagrams logically showing a relation between the storage system and the SVP according to the embodiment of this invention.
Figure 14B:
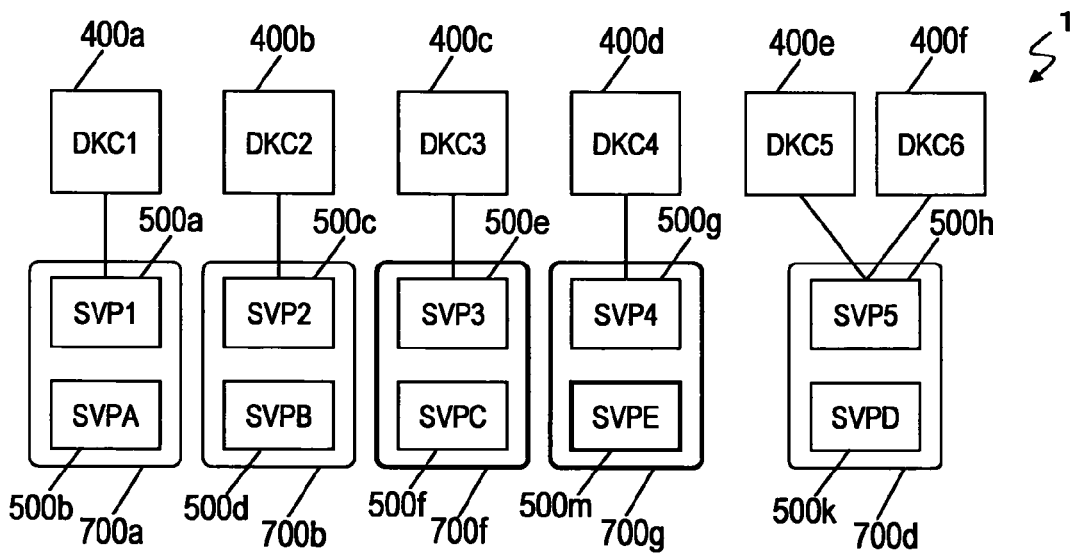
Figure 14C:
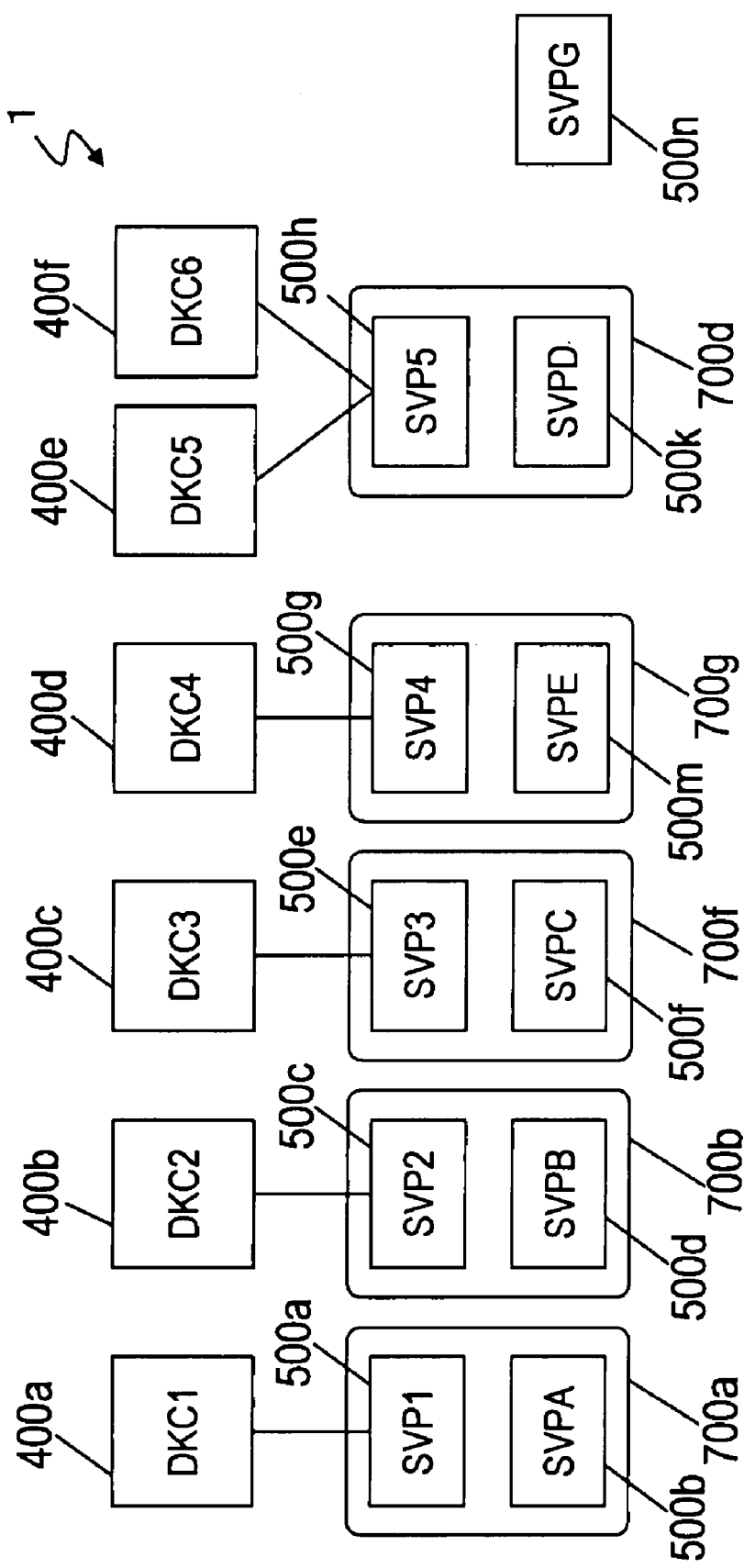

FIGS. 14A to 14C are explanatory diagrams logically showing a relation between the storage system 400 and the SVP 500 according to the embodiment of this invention.

FIG. 14A is similar to FIG. 3A. FIG. 14B shows a status after a new SVPE (SVP 500*m*) is added to FIG. 14A to reconfigure the redundant configuration 700. FIG. 14C shows a status after an SVPG (SVP 500*n*) is further added to FIG. 14B. The SVPG becomes a spare of a stand-by SVP, and the redundant configuration 700 is not reconfigured.

An SVP failback program 10000 executed when a new SVP 500 is added to the computer system 1 or a failed SVP 500 is recovered (failed back) will be described below.

<SVP Failback Program 10000>

The SVP failback program 10000 is read from the storage device 512 to be executed by the control unit 506 of the SVP 500.

The administrator designates a newly added SVP 500 or a recovered SVP 500 from the management computer 600 to execute the SVP failback program 10000 when the new SVP 500 is added to the computer system 1 or the failed SVP 500 is recovered (failed back). Alternatively, the administrator may directly use the newly added SVP 500 or the recovered SVP 500 to execute the program.

Figure 15:
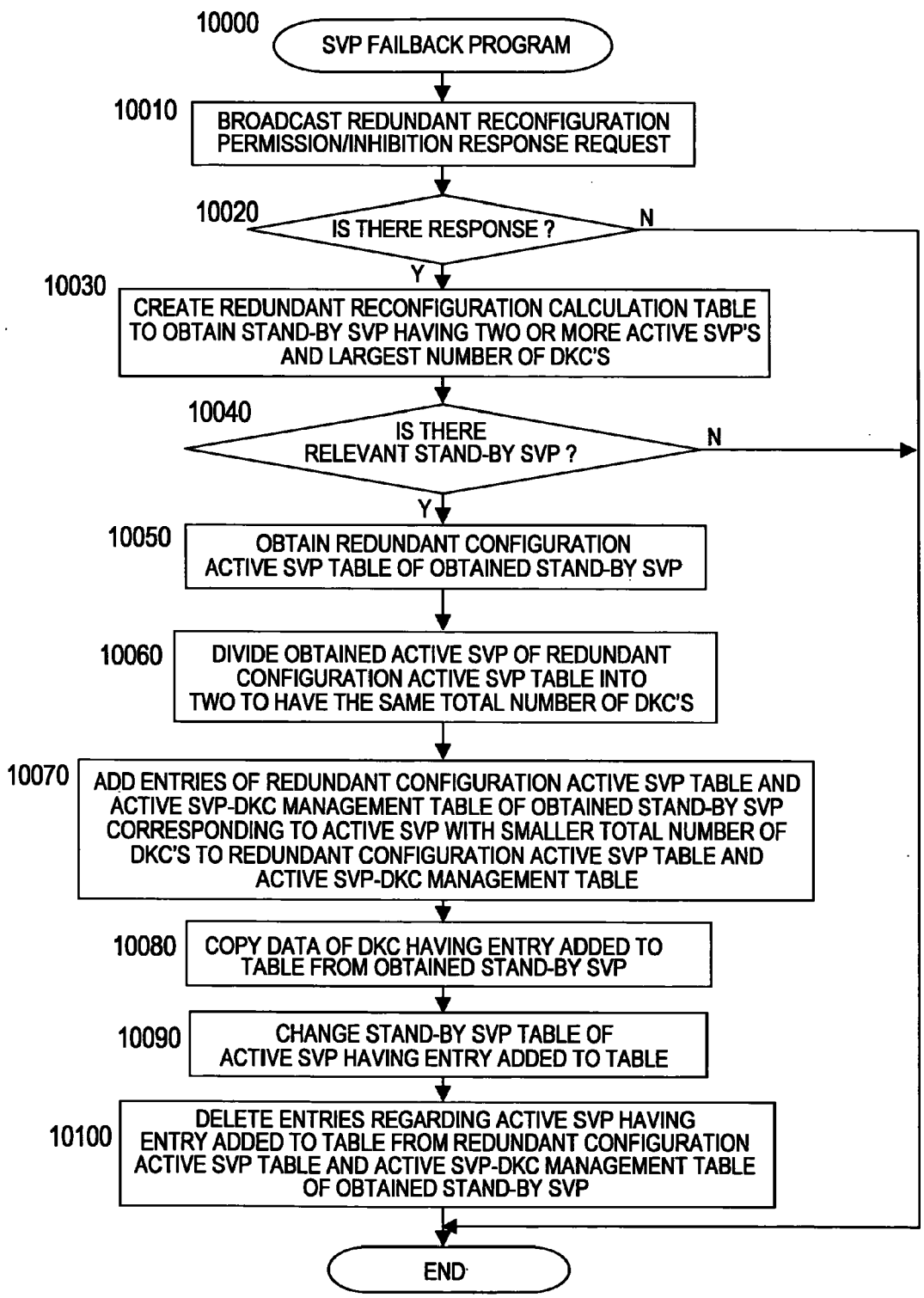
FIG. 15 is an explanatory diagram showing a process of the SVP failback program according to the embodiment of this invention.

FIG. 15 is an explanatory diagram showing a process of the SVP failback program 10000 according to the embodiment of this invention.

An example where an SVP 500*m* (SVPE) is added to the computer system 1 shown in FIG. 14A will be described.

Before execution of the SVP failback program 10000, the administrator sets an identifier "SVPE" for identifying the SVP 500*m*, an address "AddrSE1" of a first interface of the SVP 500*m* (SVPE), an address "AddrSE2" of a second interface, a status "stand-by", and reconfiguration permission/inhibition "permitted" in an SVP status table 2500*m* (not shown).

Upon execution of the SVP failback program 10000, a control unit 506 of the SVP 500*m* (SVPE) broadcasts a redundant reconfiguration permission/inhibition response request via the network 20 (Step 10010).

The control unit 506 judges whether there is a response to the redundant reconfiguration permission/inhibition response request (Step 10020). When it is judged that there is a response to the redundant reconfiguration permission/inhibition response request, the process proceeds to Step 10030. When it is judged that there is no response, the control unit 506 finishes the process.

When it is judged in Step 10020 that there is a response, the control unit 506 creates a redundant configuration calculation table 2600 based on the response to obtain an SVP ID 2601 having 2 or more active SVP's 2603 and a largest number of DKC's 2604 (Step 10030). As the active SVP does not respond to the redundant reconfiguration permission/inhibition response request, a stand-by SVP is obtained in Step 10030.

For example, it is presumed that in Step 10020, responses have been received from the SVP 500*b* (SVPA), the SVP 500*d* (SVPB), the SVP 500*f* (SVPC), and the SVP 500*k* (SVPD) which are stand-by SVP's. As shown in FIG. 14A, the SVPA returns 1 as the number of active SVP's, and 1 as the number of DKC's. The SVPB returns 1 as the number of active SVP's, and 1 as the number of DKC's. The SVPC returns 2 as the number of active SVP's, and 2 as the number of DKC's. The SVPD returns 1 as the number of active SVP's, and 2 as the number of DKC's. The control unit 506 sets each of the numbers of active SVP's and DKC's contained in the received responses as the number of active SVP's 2603 and the number of DKC's 2604 of the redundant reconfiguration calculation table 2600. In Step 10030, a selected stand-by SVP is an SVPC having 2 or more active SVP's and most DKC's.

The control unit 506 judges whether there is a stand-by SVP satisfying the conditions of the Step 10030 (Step 10040). When it is judged that there is a stand-by SVP satisfying the conditions, the process proceeds to Step 10050. A stand-by SVP satisfying the conditions will be referred to as a relevant stand-by SVP below. When it is judged that there is no relevant stand-by SVP, the control unit 506 finishes the process. When an SVP 500*m* (SVPE) is added to FIG. 14A, as described above, the SVPC is a relevant stand-by SVP which satisfies the conditions. A case where there is no stand-by SVP satisfying the conditions of the Step 10030 will be described below.

When it is judged in Step 10040 that there is a stand-by SVP satisfying the conditions of the Step 10030, loads may be concentrated on this stand-by SVP. In other words, as data obtained from many storage systems 400 are stored in the data repository 50000 of the relevant stand-by SVP, a data storage period in the relevant stand-by SVP is shorter than that in the other stand-by SVP's. In this case, by using the added SVP 500*m* (SVPE), the redundant configuration 700 is reconfigured to disperse the loads of the relevant stand-by SVP.

The control unit 506 obtains a redundant configuration active SVP table 2300*f* of the SVPC (SVP 500*f*) which is the relevant stand-by SVP (i.e., stand-by SVP obtained in Step 10030) (Step 10050).

Then, the control unit 506 divides entries included in the redundant configuration active SVP table 2300*f* of the SVPC obtained in Step 10050 into two groups so that the total numbers of DKC's 2305 become equal between the groups (Step 10060). When the entries cannot be divided completely equally, the entries may be divided so that the total numbers become almost equal. For example, such division may be executed by alternately dividing entries into two groups in order of entries having a smaller number of DKC's 2305.

In the example of the SVPC, the redundant configuration active SVP table 2300*f* includes two entries, i.e., entries in which active SVP_ID's 2301 are SVP3 and SVP4, respectively. The SVP3 manages the DKC3, and the SVP4 manages the DKC4. In this case, entries are divided into an entry group of SVP3 and an entry group of SVP4. Then, the control unit 506 obtains an active SVP included in each group. In this example, the SVP3 belonging to one group and the SVP4 belonging to the other group are obtained.

The control unit 506 selects an active SVP which belongs to a group having a smaller total number of DKC's 2305 among the active SVP's divided into the two groups in Step

10060. In the example, as the total numbers of DKC's 2305 are both 1, any group may be selected. A case where the SVP4 is selected will be described.

The control unit 506 adds (copies), among the entries of the redundant configuration active SVP table 2300*f* and the active SVP-DKC management table 2400*f* held by the stand-by SVP (SVPC (SVP 500*f*)) obtained in Step 10030, an entry regarding the SVP4 (SVP 500*g*) (entry having "SVP4" set as active SVP_ID) to the redundant configuration active SVP table 2300*m* and the active SVP_DKC management table 2400*m* of the stand-by SVP of the SVPE (SVP 500*m*) which executes the SVP failback program 10000 (Step 10070). This copying may be executed by transmitting a request of transmitting necessary entry data to the stand-by SVP obtained in Step 10030 by the SVPE (SVP 500*m*) which executes the SVP failback program 10000.

In other words, to change the stand-by SVP of the SVP4 (SVP 500*g*) from the SVPC (SVP 500*f*) to the SVPE (SVP 500*m*), the control unit 506 copies entries regarding the SVP4 (SVP 500*g*) from the redundant configuration active SVP table 2300*f* and the active SVP-DKC management table 2400*f* of the SVPC (SVP 500*f*) to the redundant configuration active SVP table 2300*m* and the active SVP-DKC management table 2400*m* of the SVPE (SVP 500*m*).

Then, the control unit 506 copies data obtained from the storage system 400*d* (DKC4) managed by the SVP4 (SVP 500*g*) having the entry added in Step 10070 from the DKC data repository 50000*f* of the SVPC (SVP 500*f*) obtained in Step 10030 to the DKC data repository 50000*m* of the SVPE (SVP 500*m*) which executes the SVP failback program (Step 10080). This copying may be executed by sending a transmission request as in Step 10070.

The control unit 506 changes the stand-by SVP_ID 2201*g* of the stand-by SVP table 2200*g* of the SVP4 (SVP 500*g*) from the SVPC (SVP 500*f*) to the SVPE (SVP 500*m*) which executes the SVP failback program in Step 10070 (Step 10090).

The control unit 506 deletes the entries regarding the SVP4 (SVP 500*g*) as the active SVP from the redundant configuration active SVP table 2300*f* and the active SVP-DKC management table 2400*f* of the SVPC (SVP 500*f*) as the stand-by SVP obtained in Step 10030 (Step 10100). As a result, the SVP4 (SVP 500*g*) that has been made redundant by the SVPC (SVP 500*f*) is made redundant by the SVPE (SVP 500*m*).

Thus, the process of the control unit 506 is finished.

Through the addition of the SVPE (SVP 500*m*) and the execution of the SVP failback program 10000, the redundant configuration 700*c* composed of the active SVP3, the active SVP4, and the stand-by SVPC shown in FIG. 14A is reconfigured to be a redundant configuration 700*f* composed of the active SVP3 and the stand-by SVPC shown in FIG. 14B, and a redundant configuration 700*g* composed of the SVP4 and the SVPE.

Each of FIGS. 14A to 14C, and 15 shows the case where the SVPE (SVP 500*m*) is newly added. A similar processing is executed when the SVPE (SVP 500*m*) is recovered from a failure.

Through the execution of the SVP failback program 10000, addition of a new SVP 500 and failback of a recovered SVP 500 can be easily executed automatically without manually changing the configuration of the storage system 400 and the SVP 500 by the administrator.

In Step 10030, by selecting a stand-by SVP having a largest number of DKC's and reconfiguring the redundant configuration 700, data of the storage system 400 stored by the stand-by SVP for redundancy is equally dispersed among the stand-by SVP's. Accordingly, loads of the stand-by SVP are balanced, and a data amount of one storage system 400 stored in a limited storage volume can be increased (in other words, data storage period can be made longer).

In Step 10030, if there are a plurality of stand-by SVP's having most DKC's, a stand-by SVP installed at a position geographically near the newly added SVP 500 may be selected. The geographical position may be represented by any coordinates. For example, when SVP's 500 included in the computer system 1 are installed on a plurality of floors of one building, the installation floor number 2605 of the SVP status table 2500 of the newly added SVP 500 may be compared with the installation floor number 2605 of the redundant reconfiguration calculation table 2600. In this case, a stand-by SVP which has the same installation floor number as the installation floor number 2506 or a closest installation floor number 2605 may be selected. Thus, by selecting the geographically near stand-by SVP, when a work of directly handling the SVP device, such as maintenance of the SVP itself, is necessary, it is possible to remove worker's time and labor of movement among the plurality of SVP's 500 of the redundant configuration 700.

A case where it is judged in Step 10040 that there is no relevant stand-by SVP will be described. An example where an SVPG (SVP 500*n*) is further added to the computer system 1 shown in FIG. 14B will be described.

When adding the SVPG (SVP 500*n*), as in the case of the SVPE (SVP 500*m*), before execution of the SVP failback program 10000, the administrator sets an identifier "SVPG" for identifying the SVP 500*n*, an address "AddrSG1" of a first interface, an address "AddrSG2" of a second interface, a status "stand-by", and reconfiguration permission/inhibition in the SVP status table 2500*n* (not shown).

In Step 10010, the control unit 506 of the SVPG (SVP 500*n*) broadcasts a redundant reconfiguration permission/inhibition response request.

In Step 10020, it is presumed that responses have been received from the SVP 500*b* (SVPA), the SVP 500*d* (SVPB), the SVP 500*f* (SVPC), the SVP 500*k* (SVPD), and the SVP 500*m* (SVPE) which are stand-by SVP's. As shown in FIG. 14B, the SVPA returns 1 as the number of active SVP's, and 1 as the number of DKC's. The SVPB returns 1 as the number of active SVP's, and 1 as the number of DKC's. The SVPC returns 2 as the number of active SVP's, and 1 as the number of DKC's. The SVPD returns 1 as the number of active SVP's, and 2 as the number of DKC's. The SVPE returns 1 as the number of active SVP's, and 1 as the number of DKC's.

In Step 10030, a stand-by SVP having two or more active SVP's and most DKC's, which are conditions of a stand-by SVP to be selected is selected. However, in the example, there are no stand-by SVP having two or more active SVP's. Accordingly, in Step 10040, it is judged that there is no relevant stand-by SVP, and the process is finished.

As a result, as the redundant configuration active SVP table 2300*n* and the active SVP-DKC management table 2400*n* of the SVPG (SVP 500*n*) include no entries, there is no active SVP to be made redundant by the SVPG (SVP 500*n*). In other words, the SVPG (SVP 500*n*) is a stand-by SVP which does not constitute a redundant configuration 700. Such an SVP is a spare stand-by SVP. FIG. 14C shows the computer system 1 which includes an SVPG (SVP 500*n*) as such a spare stand-by SVP.

The SVPG (SVP 500*n*) as the spare stand-by SVP includes no entry in the redundant configuration active SVP table 2300*n*. Thus, upon reception of a redundant reconfiguration permission/inhibition response request, the control unit 506 of the SVPG (SVP 500*n*) executes the redundant reconfiguration permission/inhibition response program 8000 to return 0 as the number of active SVP's and 0 as the number of DKC's in response.

According to the active SVP monitor program 4000 and the stand-by SVP monitor program 6000, a stand-by SVP having a smallest number of DKC's is selected for the redundant reconfiguration permission/inhibition response request. Thus, when a failure occurs in the active or stand-by SVP, and the redundant configuration is reconfigured, the spare stand-by SVP is preferentially selected, and the redundant configuration 700 including the spare stand-by SVP is reconfigured.

According to the embodiment of this invention, upon detection of the failure of the other maintenance/management appliance, the maintenance/management appliance reconfigures the redundant configuration to prevent an SPOF caused by the failed maintenance/management appliance.

Specifically, when an failure occurs in the main maintenance/management appliance (i.e., active maintenance/management appliance), the main maintenance/management appliance is failed over to the sub-maintenance/management appliance (i.e., stand-by maintenance/management appliance), and reconfigures the redundant configuration by using the other sub-maintenance/management appliance existing in the computer system.

On the other hand, when an failure occurs in the sub-maintenance/management appliance, the main maintenance/management appliance reconfigures the redundant configuration by using the other sub-maintenance/management appliance existing in the computer system.

As described above, when an failure occurs in one of the main maintenance/management appliance and sub-maintenance/management appliance, the redundant configuration including the other sub-maintenance/management appliance is reconfigured to prevent an SPOF.

Thus, according to the embodiment of this invention, even after the appliance for managing the storage system in which a failure has occurred, is failed over to the stand-by management appliance, a single point of failure (SPOF) can be prevented without any manual setting by the administrator. Hence, it is possible to improve reliability of storage system management.

While the present invention has been described in detail and pictorially in the accompanying drawings, the present invention is not limited to such detail but covers various obvious modifications and equivalent arrangements, which fall within the purview of the appended claims.

What is claimed is:

1. A method of controlling a computer system having a plurality of storage systems and a plurality of management apparatuses for managing the plurality of storage systems,
   each of the storage systems including a storage device for storing data and a controller for controlling storage of data in the storage device,
   each of the management apparatuses including a first interface for receiving data obtained from the storage system, a processor coupled to the first interface, and a memory coupled to the processor,
   the first interface being coupled to a first network for interconnecting the plurality of management apparatuses to communicate with one another,
   the plurality of management apparatuses including a first management apparatus, a second management apparatus, and a third management apparatus,
   the storage systems including a first storage system, the first management apparatus and the second management apparatus holding an identifier of the first storage system and management data obtained from the first storage system,
   the method comprising the steps of:
   operating the first management apparatus as an active and the second management apparatus as a stand-by to manage the first storage system;
   selecting the third management apparatus from the plurality of management apparatuses when a failure occurs in the first management apparatus;
   transmitting the identifier of the first storage system held in the second management apparatus from the second management apparatus to the selected third management apparatus;
   holding the identifier of the first storage system transmitted from the second management apparatus in the selected third management apparatus; and
   operating the second management apparatus as an active and the third management apparatus as a stand-by to manage the first storage system after occurring the failure.

2. The method according to claim 1,
   each of the plurality of management apparatuses including the first management apparatus, the second management apparatus, and the third management apparatus being one of an active management apparatus for transmitting the management data obtained from the storage system to another management apparatus and a stand-by management apparatus for receiving the management data transmitted from the active management apparatus,
   the method further comprising the steps of:
   transmitting the management data obtained from the first storage system and held in the second management apparatus from the second management apparatus to the selected third management apparatus; and
   holding the management data transmitted from the second management apparatus in the selected third management apparatus,
   wherein the step of selecting the third management apparatus from the plurality of management apparatuses is executed by selecting a stand-by management apparatus whose number of managing storage systems is the smallest in a plurality of management apparatuses.

3. The method according to claim 1,
   the plurality of storage systems further including a second storage system,
   the plurality of management apparatuses further including a fourth management apparatus and a fifth management apparatus,
   the first management apparatus transmitting the management data obtained from the first storage system to the second management apparatus,
   the fourth management apparatus transmitting the management data obtained from the second storage system to the second management apparatus,
   the second management apparatus receiving the management data from the first management apparatus and the fourth management apparatus, holding the received management data, and holding the identifier of the first storage system and an identifier of the second storage system,
   each of the plurality of management apparatuses including the fifth management apparatus being one of an active management apparatus for transmitting the management data obtained from the storage system to another management apparatus and a stand-by management apparatus for receiving the management data transmitted from the active management apparatus, the method further comprising the steps of:

transmitting the management data obtained from the first storage system and held in the second management apparatus from the second management apparatus to the selected third management apparatus;

holding the management data transmitted from the second management apparatus in the selected third management apparatus;

selecting the fifth management apparatus from the plurality of management apparatuses when a failure occurs in the first management apparatus;

transmitting the identifier of the second storage system and the management data received from the fourth management apparatus held in the second management apparatus from the second management apparatus to the fifth management apparatus; and holding the identifier of the second storage system and the management data transmitted from the second management apparatus in the fifth management apparatus, wherein the step of selecting the fifth management apparatus from the plurality of management apparatuses is executed by selecting a stand-by management apparatus having a smallest number of storage devices being acquisition sources of the held management data.

4. The method according to claim 1, each of the plurality of management apparatuses including the first management apparatus, the second management apparatus, and the third management apparatus is being one of an active management apparatus for transmitting the management data obtained from the storage system to another management apparatus and a stand-by management apparatus for receiving the management data transmitted from the active management apparatus, the method further comprising the steps of:

transmitting the management data obtained from the first storage system and held in the second management apparatus from the second management apparatus to the selected third management apparatus; and holding the management data transmitted from the second management apparatus in the selected third management apparatus, wherein the step of selecting the third management apparatus from the plurality of management apparatuses is executed by selecting a stand-by management apparatus installed in a position nearest to the second management apparatus.

5. The method according to claim 1, each of the plurality of management apparatuses including the first management apparatus, the second management apparatus, and the third management apparatus being one of an active management apparatus for transmitting the management data obtained from the storage system to another management apparatus and a stand-by management apparatus for receiving the management data transmitted from the active management apparatus, each of the management apparatuses holding information indicating whether to respond to a predetermined request, the method further comprising the steps of:

transmitting the management data obtained from the first storage system and held in the second management apparatus from the second management apparatus to the selected third management apparatus; and holding the management data transmitted from the second management apparatus in the selected third management apparatus, wherein:

the step of selecting the third management apparatus from the plurality of management apparatuses includes the steps of:

transmitting the predetermined request from the second management apparatus to the plurality of management apparatuses;

transmitting a response from the management apparatus which hold information indicating that a response is made to the predetermined request; and selecting the third management apparatus from the plurality of management apparatuses which have transmitted the response to the predetermined request;

the response contains an address of the first interface of the management apparatus which have transmitted the response, and the number of storage systems being acquisition sources of the management data held in the management apparatus which have transmitted the response; and the information held in the active management apparatus indicates that no response is made to the predetermined request.

6. The method according to claim 1, the plurality of management apparatuses further including a sixth management apparatus, each of the plurality of management apparatuses including the first management apparatus, the second management apparatus, the third management apparatus, and the sixth management apparatus being one of an active management apparatus for transmitting the management data obtained from the storage system to another management apparatus and a stand-by management apparatus for receiving the management data transmitted from the active management apparatus, the method further comprising the steps of:

transmitting the management data obtained from the first storage system and held in the second management apparatus from the second management apparatus to the selected third management apparatus;

holding the management data transmitted from the second management apparatus in the selected third management apparatus;

selecting a stand-by management apparatus whose number of managing storage systems is the largest in a plurality of management apparatuses;

selecting at least one of the plurality of active management apparatuses which have transmitted the management data to the selected stand-by management apparatus;

transmitting an identifier of the storage system from which the selected at least one active management apparatus has obtained the management data from the selected stand-by management apparatus to the sixth management apparatus;

transmitting management data transmitted from the selected at least one active management apparatus among the management data held by the selected stand-by management apparatus from the selected stand-by management apparatus to the sixth management apparatus; and holding the identifier of the storage system and the management data transmitted from the selected stand-by management apparatus in the sixth management apparatus.

7. The method according to claim 6, further comprising preventing, when the computer system does not include the stand-by management apparatus which obtains the management data from the plurality of active management apparatuses, execution of the steps of:
  selecting a stand-by management apparatus whose number of managing storage systems is the largest in a plurality of management apparatuses;
  selecting at least one of the plurality of active management apparatuses;
  transmitting the management data transmitted from the selected at least one active management apparatus from the selected stand-by management apparatus to the sixth management apparatus; and
  holding the transmitted management data in the sixth management apparatus.

8. The method according to claim 1,
  the plurality of management apparatuses further including a sixth management apparatus, and
  each of the plurality of management apparatuses including the first management apparatus, the second management apparatus, the third management apparatus, and the sixth management apparatus being one of an active management apparatus for transmitting the management data obtained from the storage system to another management apparatus and a stand-by management apparatus for receiving the management data transmitted from the active management apparatus,
  the method further comprising the steps of:
  transmitting the management data obtained from the first storage system and held in the second management apparatus from the second management apparatus to the selected third management apparatus;
  holding the management data transmitted from the second management apparatus in the selected third management apparatus;
  selecting a stand-by management apparatus installed in a position nearest to the sixth management apparatus among the stand-by management apparatuses which obtain the management data from the plurality of active management apparatuses;
  selecting at least one of the plurality of active management apparatuses which have transmitted the management data to the selected stand-by management apparatus;
  transmitting an identifier of the storage system from which the selected at least one active management apparatus has obtained the management data from the selected stand-by management apparatus to the sixth management apparatus;
  transmitting management data transmitted from the selected at least one active management apparatus among the management data held by the selected stand-by management apparatus from the selected stand-by management apparatus to the sixth management apparatus; and
  holding the identifier of the storage system and the management data transmitted from the selected stand-by management apparatus in the sixth management apparatus.

9. The method according to claim 1, wherein:
  the controller of the storage system includes a third interface coupled to a computer, a second processor coupled to the third interface, and a cache memory coupled to the second processor for temporarily storing data; and
  the management data contains at least one selected from data indicating whether a failure has occurred in the second processor, data indicating a use rate of the cache memory, data indicating the number of times of inputting and outputting data to and from the third interface, and data indicating the number of times of inputting and outputting data to and from the storage device.

10. A management apparatus for managing at least one of a plurality of storage systems included in a computer system, the storage systems including a first storage system,
  the computer system including, in addition to the management apparatus, a plurality of other management apparatuses for managing at least one of the plurality of storage systems,
  the plurality of other management apparatuses including a first management apparatus and a second management apparatus,
  the management apparatus comprising:
  a first interface for receiving data obtained from the storage systems;
  a processor coupled to the first interface; and
  a memory coupled to the processor, wherein:
  the management apparatus holds management data obtained from the first storage system;
  the management apparatus is coupled to the plurality of other management apparatuses to communicate with the apparatuses via a first network coupled to the first interface;
  the first management apparatus holds an identifier of the first storage system and the management data obtained from the first storage system;
  the first management apparatus is operated as an active to manage the first storage system;
  the second management apparatus is operated as a stand-by to manage the first storage system;
  the processor selects the second management apparatus from the plurality of other management apparatuses when a failure occurs in the first management apparatus;
  the processor transmits the identifier of the first storage system held in the management apparatus to the selected second management apparatus via the first network;
  after occurring the failure, the second management apparatus is operated as an active to manage the first storage system; and
  the third management apparatus is operated as a stand-by to manage the first storage system.

11. The management apparatus according to claim 10, wherein:
  each of the management apparatus and the plurality of other management apparatuses including the first management apparatus and the second management apparatus is one of an active management apparatus for transmitting the management data obtained from the storage system to one of the management apparatus and the other management apparatuses and a stand-by management apparatus for receiving the management data transmitted from the active management apparatus; and
  the processor selects the stand-by management apparatus having a smallest number of storage systems being acquisition sources of the held management data as the second management apparatus; and
  the processor transmits the management data obtained from the first storage system and held in the management apparatus to the selected second management apparatus via the first network.

12. The management apparatus according to claim 10, wherein:
  the plurality of storage systems further include a second storage system;
  the plurality of other management apparatuses further include a third management apparatus and a fourth management apparatus;

the management apparatus receives the management data obtained from the first storage system by the first management apparatus from the first management apparatus;

the management apparatus receives the management data obtained from the second storage system by the third management apparatus from the third management apparatus, and holds the received management data and the identifier of the first storage system and an identifier of the second storage system;

each of the plurality of management apparatuses including the fourth management apparatus is one of an active management apparatus for transmitting the management data obtained from the storage system to one of the management apparatus and the other management apparatuses and a stand-by management apparatus for receiving the management data transmitted from the active management apparatus;

the processor transmits the management data obtained from the first storage system and held in the management apparatus to the selected second management apparatus via the first network;

the processor selects a stand-by management apparatus whose number of managing storage systems is the smallest in a plurality of management apparatuses as the fourth management apparatus when a failure occurs in the first management apparatus; and the processor transmits the identifier of the second storage system and the management data received from the third management apparatus held in the management apparatus to the fourth management apparatus via the first network.

13. The management apparatus according to claim 10, wherein:

each of the management apparatus and the plurality of other management apparatuses including the first management apparatus and the second management apparatus is one of an active management apparatus for transmitting the management data obtained from the storage system to one of the management apparatus and the other management apparatuses and a stand-by management apparatus for receiving the management data transmitted from the active management apparatus;

the processor selects a stand-by management apparatus installed in a position nearest to the management apparatus as the second management apparatus; and the processor transmits the management data obtained from the first storage system and held in the management apparatus to the selected second management apparatus via the first network.

14. The management apparatus according to claim 10, wherein:

each of the management apparatus and the plurality of other management apparatuses including the first management apparatus and the second management apparatus is one of an active management apparatus for transmitting the management data obtained from the storage system to one of the management apparatus and the other management apparatuses and a stand-by management apparatus for receiving the management data transmitted from the active management apparatus;

the management apparatus holds information indicating whether to respond to a predetermined request;

the processor transmits the predetermined request to the plurality of other management apparatuses via the first interface;

the processor selects the second management apparatus from the plurality of other management apparatuses which have transmitted a response to the predetermined request; and the processor transmits the management data obtained from the first storage system and held in the management apparatus to the selected second management apparatus via the first network.

15. The management apparatus according to claim 14, wherein:

the processor that has received the predetermined request via the first interface transmits a response to the predetermined information when the information indicates that a response is made to the predetermined request;

the response contains an address of the first interface of the management apparatus which has transmitted the response, and the number of managing storage systems by the management apparatus which has transmitted the response; and the information indicates that no response is made to the predetermined request when the management apparatus is the active management apparatus.

16. The management apparatus according to claim 10, wherein:

each of the management apparatus and the plurality of other management apparatuses including the first management apparatus and the second management apparatus is one of an active management apparatus for transmitting the management data obtained from the storage system to one of the management apparatus and the other management apparatuses and a stand-by management apparatus for receiving the management data transmitted from the active management apparatus;

the processor transmits the management data obtained from the first storage system and held in the management apparatus to the selected second management apparatus via the first network;

the processor selects a stand-by management apparatus whose number of managing storage systems is the largest in a plurality of management apparatuses which obtain the management data from the plurality of active management apparatuses;

the processor selects at least one of the plurality of active management apparatuses which have transmitted the management data to the selected stand-by management apparatus;

the processor requests the selected active management apparatus to transmit an identifier of the storage system from which the selected at least one active management apparatus has obtained the management data to the management apparatus;

the processor requests the selected stand-by management apparatus to transmit the management data transmitted from the selected at least one active management apparatus among the management data held in the selected stand-by management apparatus to the management apparatus; and the processor holds the management data transmitted from the selected stand-by management apparatus.

17. The management apparatus according to claim 16, wherein when the computer system does not include the stand-by management apparatus which obtains the management data from the plurality of active management apparatuses, the processor avoids execution of the steps of:

selecting a stand-by management apparatus whose number of managing storage systems is the largest in a plurality of management apparatuses;

selecting at least one of the plurality of active management apparatuses;

requesting the selected stand-by management apparatus to transmit the management data transmitted from the selected at least one active management apparatus to the management apparatus; and holding the transmitted management data.

18. The management apparatus according to claim 10, wherein:

each of the management apparatus and the plurality of other management apparatuses including the first management apparatus and the second management apparatus is one of an active management apparatus for transmitting the management data obtained from the storage system to one of the management apparatus and the other management apparatuses and a stand-by management apparatus for receiving the management data transmitted from the active management apparatus;

the processor transmits the management data obtained from the first storage system and held in the management apparatus to the selected second management apparatus via the first network;

the processor selects a stand-by management apparatus installed in a position nearest to the management apparatus among the stand-by management apparatuses which obtain the management data from the plurality of active management apparatuses;

the processor selects at least one of the plurality of active management apparatuses which have transmitted the management data to the selected stand-by management apparatus;

the processor requests the selected stand-by management apparatus to transmit an identifier of the storage system from which the selected at least one active management apparatus has obtained the management data to the management apparatus;

the processor requests the selected stand-by management apparatus to transmit the management data transmitted from the selected at least one active management apparatus among the management data held in the selected stand-by management apparatus to the management apparatus; and the processor holds the management data transmitted from the selected stand-by management apparatus.

19. The management apparatus according to claim 10, wherein:

the controller of the storage system includes a third interface coupled to a computer, a second processor coupled to the third interface, and a cache memory coupled to the second processor for temporarily storing data; and the management data contains at least one selected from data indicating whether a failure has occurred in the second processor, data indicating a use rate of the cache memory, data indicating the number of times of inputting and outputting data to and from the third interface, and data indicating the number of times of inputting and outputting data to and from the storage device.

* * * * *